(12) United States Patent
Starling

(10) Patent No.: US 8,038,751 B2
(45) Date of Patent: Oct. 18, 2011

(54) COATED ABRASIVE PRODUCTS CONTAINING AGGREGATES

(75) Inventor: Shelly C. Starling, Lansdale, PA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 777 days.

(21) Appl. No.: 12/018,589

(22) Filed: Jan. 23, 2008

(65) Prior Publication Data

US 2008/0172951 A1    Jul. 24, 2008

Related U.S. Application Data

(60) Provisional application No. 60/897,023, filed on Jan. 23, 2007.

(51) Int. Cl.
*B24B 1/00* (2006.01)
*B24D 3/00* (2006.01)
*B24D 3/02* (2006.01)
*C09K 3/14* (2006.01)

(52) U.S. Cl. ........... 51/295; 51/293; 51/307; 51/309; 51/298

(58) Field of Classification Search .......... 51/293, 51/298, 307–309, 295
See application file for complete search history.

(56) References Cited

U.S. PATENT DOCUMENTS

| | | | |
|---|---|---|---|
| 4,842,619 A * | 6/1989 | Fritz et al. | 51/295 |
| 4,918,874 A * | 4/1990 | Tiefenbach, Jr. | 51/293 |
| 4,920,082 A | 4/1990 | Danielson | |
| 5,108,463 A | 4/1992 | Buchanan | |
| 5,137,542 A | 8/1992 | Buchanan et al. | |
| 5,304,586 A | 4/1994 | Hammesfahr et al. | |
| 5,328,716 A | 7/1994 | Buchanan | |
| 5,906,490 A | 5/1999 | Kramer Primus et al. | |
| 6,238,450 B1 * | 5/2001 | Garg et al. | 51/309 |
| 6,261,682 B1 | 7/2001 | Law | |
| 6,395,044 B1 | 5/2002 | Swei et al. | |
| 6,517,423 B2 | 2/2003 | Ueno | |
| 6,551,366 B1 * | 4/2003 | D'Souza et al. | 51/309 |
| 6,551,974 B1 | 4/2003 | Conrad et al. | |
| 6,753,359 B2 | 6/2004 | Thurber et al. | |
| 2002/0090891 A1 | 7/2002 | Adefris et al. | |
| 2004/0067649 A1 * | 4/2004 | Hellring et al. | 438/689 |

FOREIGN PATENT DOCUMENTS

| | | |
|---|---|---|
| EP | 1339531 B1 | 8/2007 |
| WO | 2006050792 A1 | 5/2006 |
| WO | 2008091939 A3 | 7/2008 |
| WO | 2010011579 A2 | 1/2010 |

OTHER PUBLICATIONS

U.S. Appl. No. 12/505,345, filed Jul. 17, 2009, Inventors: Shelly C. Starling et al.

* cited by examiner

*Primary Examiner* — Shuangyi Abu Ali

(74) *Attorney, Agent, or Firm* — Abel Law Group, LLP; Joseph P. Sullivan

(57) ABSTRACT

A coated abrasive product includes a particulate material containing green, unfired abrasive aggregates having a generally spheroidal or toroidal shape, the aggregates formed from a composition comprising abrasive grit particles and a nanoparticle binder. Free abrasive products, bonded abrasive products, and the particulate material also contain aggregates.

28 Claims, 9 Drawing Sheets

COATED ABRASIVE PRODUCTS CONTAINING AGGREGATES

CROSS-REFERENCE TO RELATED APPLICATION(S)

The present application claims priority to and incorporates by reference the matter of provisional patent application 60/897,023 filed Jan. 23, 2007.

BACKGROUND

1. Field of the Disclosure

The present disclosure is generally directed to abrasive particulate material, abrasive products incorporating abrasive particulate material, and methods for machining workpieces.

2. Description of the Related Art

Abrasive products are generally contain or formed from abrasive particulate material. Such abrasive particulate material can be used as a free abrasive, such as in the form of a slurry, or a fixed abrasive, typically either a coated abrasive or a bonded abrasive article. Abrasive products are used in various industries to machine workpieces, such as by lapping, grinding, or polishing. Machining utilizing abrasive articles spans a wide industrial scope from optics industries, automotive paint repair industries, dental applications, to metal fabrication industries. Machining, such as by hand or with use of commonly available tools such as orbital polishers (both random and fixed axis), and belt and vibratory sanders, is also commonly done by consumers in household applications. In each of these examples, abrasives are used to remove bulk material and/or affect surface characteristics of products (e.g., planarity, surface roughness).

Surface characteristics include shine, texture, and uniformity. For example, manufacturers of metal components use abrasive articles to fine polish surfaces, and oftentimes desire a uniformly smooth surface. Similarly, optics manufacturers desire abrasive articles that produce defect free surfaces to prevent light diffraction and scattering. Hence, the abrasive surface of the abrasive article generally influences surface quality.

Abrasive particle formation, such as through chemical synthesis routes or through bulk material processing routes (e.g., fusion and commination), is considered a fairly well developed and mature art area. Accordingly, notable developmental resources have been dedicated to development of macrostructures, such as development of engineered abrasives products within the context of coated abrasives and particular three-dimensional structures and formulations in the context of bonded abrasives. Despite continued developments, a need continues to exist in the art for improved particulate material.

Particulate materials include essentially single phase inorganic materials, such as alumina, silicon carbide, silica, ceria, and harder, high performance superabrasive grains such as cubic boron nitride and diamond. Enhanced and even more sophisticated abrasive properties have been achieved through development of composite particulate materials. Such materials include formation of aggregates, which can be formed through slurry processing pathways that include removal of the liquid carrier through volatilization or evaporation, leaving behind green agglomerates, followed by high temperature treatment (i.e., firing) to form usable, fired agglomerates.

Such composite agglomerates have found commercial use in various abrasive product deployments. However, the industry continues to demand even further improved particulate materials, and particularly composite aggregates that may offer enhanced machining performance.

SUMMARY

According to one embodiment, a coated abrasive product includes a substrate and particulate material bonded thereto, the particulate material containing green, unfired abrasive aggregates having a generally spheroidal or toroidal shape, the aggregates formed from a composition comprising abrasive grit particles, a nanoparticle binder.

According to another embodiment, an abrasive slurry includes green, unfired abrasive aggregates provided in suspension, the aggregates having a generally spheroidal or toroidal shape, the aggregates comprising an abrasive grit particles and a nanoparticle binder.

According to another embodiment, a fixed abrasive in the form of a bonded abrasive includes green, unfired abrasive aggregates that are fixed in position with respect to each other with an inter-aggregate binder, the aggregates having a generally spheroidal or toroidal shape, the aggregates comprising an abrasive grit particles and a nanoparticle binder.

According to another embodiment, a method for forming abrasive particulate material includes forming a slurry comprising a liquid carrier, abrasive grit particles and a nanoparticle binder; and spray drying the slurry to form green, unfired aggregates containing the abrasive grit particles and the nanoparticle binder. Further, the aggregates are classified for use in an abrasive product According to another embodiment, a method for machining a workpiece includes providing a workpiece having an initial surface roughness $Ra_i$, abrading the workpiece with a single abrasive product to remove material from the workpiece, whereby the workpiece has a final surface roughness $Ra_f$ and $Ra_f$ is not greater than $0.2\ Ra_i$.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
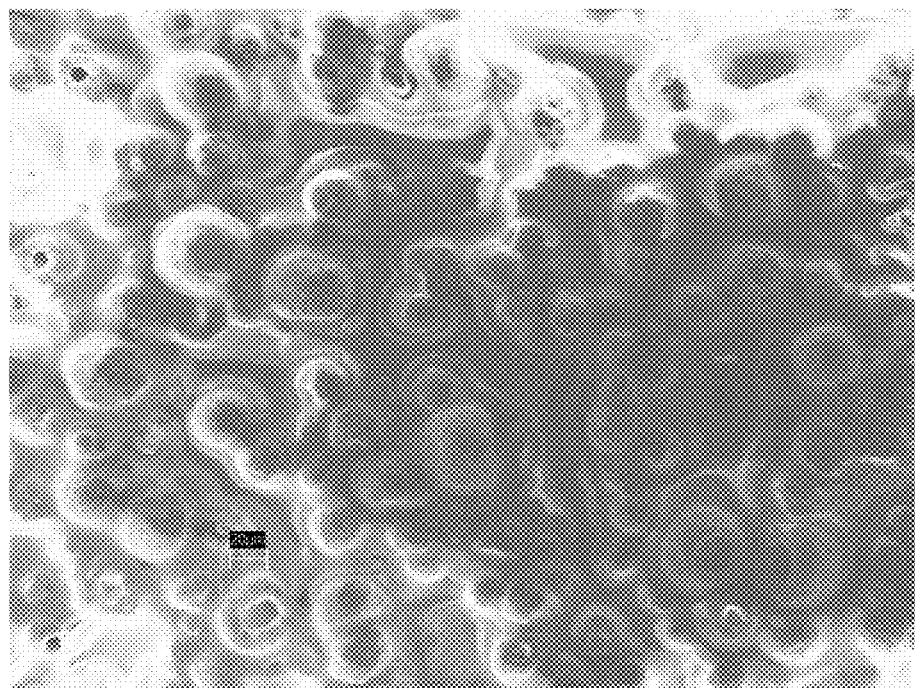
FIGS. 1-3 are photomicrographs taken with a scanning electron microscope showing abrasive aggregates including diamond grit combined with silica nanoparticles in a coating on a substrate according to one embodiment of the present disclosure.
Figure 2:
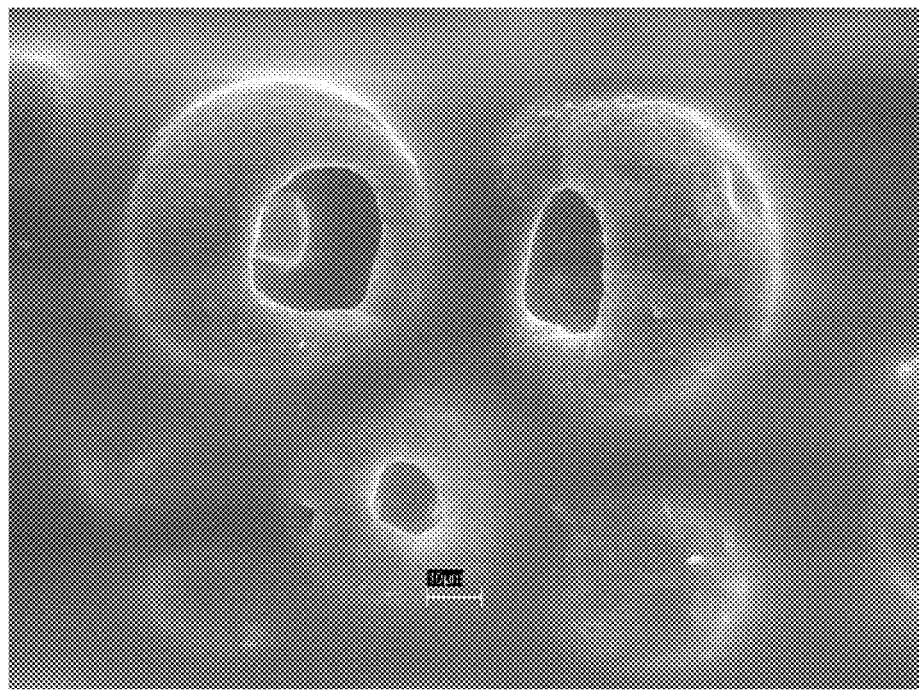
Figure 3:
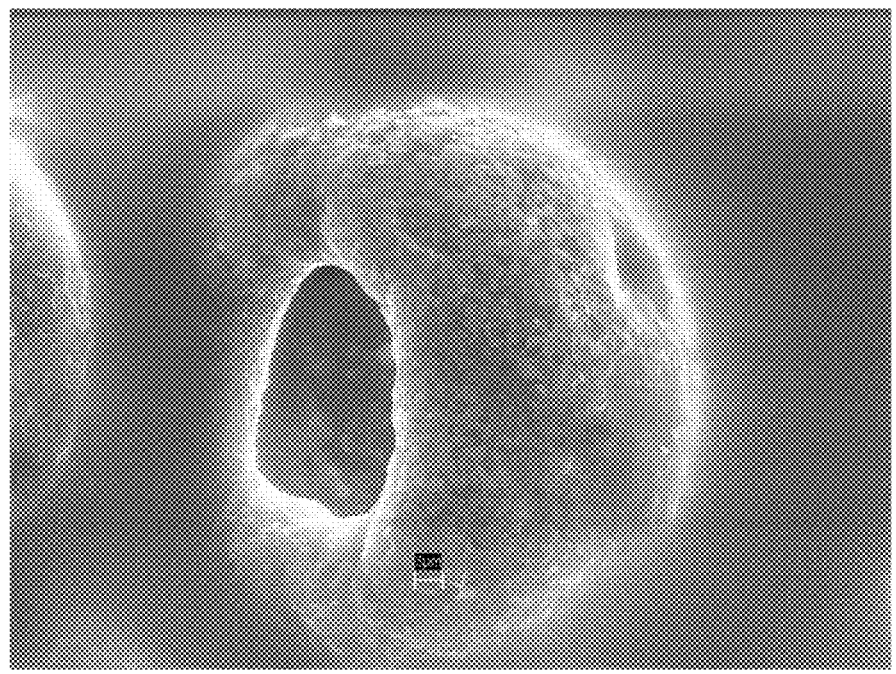

According to an embodiment, abrasive aggregates are provided that are particularly suitable for machining operations, in which abrasion is carried out to remove material and improve surface quality. Abrasive aggregates can be formed through slurry-based processing. Here, embodiments may take advantage of spray drying, where a slurry containing the constituent materials of the aggregates and a liquid carrier, such as water, are mixed together, nebulized into droplets, and dried. In more detail, certain embodiments combine an abrasive grit, which may be in the form of microparticles, a binder, which may be in the form of a nanoparticles, and a liquid carrier, which can be water for ease of handling and processing. Various embodiments further include a plasticizer, also known as a dispersant, in the slurry to promote dispersion of the abrasive grit within the thus formed, spray dried aggregates.

As used herein, the term "microparticle" may be used to refer to a particle having an average particle size of from about 0.1 microns to about 50 microns, preferably not less than 0.2 microns, 0.5 microns, or 0.75 microns, and not greater than about 20 microns, such as not greater than 10 microns. Particular embodiments have an average particle size from about 0.5 microns to about 10 microns.

As used herein, the term "nanoparticle" may be used to refer to a particle having an average particle size of from about 5 nm to about 150 nm, typically less than about 100 nm, 80 nm, 60 nm, 50 nm, or less than about 40 nm. Typical average particle sizes of nanoparticles lie within a range of about 20 nm to about 50 nm As used herein, the term "aggregate" may be used to refer to a particle made of a plurality of smaller particles that have been combined in such a manner that it is relatively difficult to separate or disintegrate the aggregate particle into smaller particles by the application of pressure or agitation. This is in contrast to the term "agglomerate" used herein to refer to a particle made of a plurality of smaller particles which have been combined in such a manner that it is relatively easy to separate the aggregate particle or disintegrate the particle back into the smaller particles, such as by the application of pressure or hand agitation. According to present embodiments, the aggregates have a composite structure, including both abrasive grits that have a size within the microparticle range, and a nanoparticle binder that provides the matrix of the aggregate in which the abrasive grits are embedded or contained. As will be described in more detail, aggregates according to embodiments have notable morphology, characterized by uniform distribution of the abrasive grits in the nanoparticle binder.

Of notable consequence, aggregates according to various embodiments are in the green, unfired state. Here, the aggregates are utilized as or in an abrasive product without notable post-formation heat treatment, such as calcining, sintering, or recrystallization, that alter the crystallite size, grain size, density, tensile strength, young's modulus, and the like of the aggregates. Such heat treatment processes are commonly carried out in ceramic processing to provide usable products, but are not utilized herein. Such heat treatment steps are generally carried out in excess of 400° C., generally 500° C. and above. Indeed, temperatures can easily range from 800° C. to 1200° C. and above for certain ceramic species.

The abrasive grit particles generally have a Mohs hardness of greater than about 3, and preferably from about 3 to about 10. For particular applications, the abrasive grit particles have a Mohs hardness not less than 5, 6, 7, 8, or 9. The abrasive grit particles are generally believed to serve as the primary active grinding or polishing agent in the abrasive aggregates. Examples of suitable abrasive compositions include non-metallic, inorganic solids such as carbides, oxides, nitrides and certain carbonaceous materials. Oxides include silicon oxide (such as quartz, cristobalite and glassy forms), cerium oxide, zirconium oxide, aluminum oxide. Carbides and nitrides include, but are not limited to, silicon carbide, aluminum, boron nitride (including cubic boron nitride), titanium carbide, titanium nitride, silicon nitride. Carbonaceous materials include diamond, which broadly includes synthetic diamond, diamond-like carbon, and related carbonaceous materials such as fullerite and aggregate diamond nanorods. Materials may also include a wide range of naturally occurring mined minerals, such as garnet, cristobalite, quartz, corundum, feldspar, by way of example. Certain embodiments of the present disclosure, take advantage of diamond, silicon carbide, aluminum oxide, and/or cerium oxide materials, with diamond being shown to be notably effective. In addition, those of skill will appreciate that various other compositions possessing the desired hardness characteristics may be used as abrasive grit particles in the abrasive aggregates of the present disclosure. In addition, in certain embodiments according to the present disclosure, mixtures of two or more different abrasive grit particles can be used in the same aggregates.

As should be understood from the foregoing description, a wide variety of abrasive grit particles may be utilized in embodiments. Of the foregoing, cubic boron nitride and diamond are considered "superabrasive" particles, and have found widespread commercial use for specialized machining operations, including highly critical polishing operations. Further, the abrasive grit particles may be treated so as to form a metallurgical coating on the individual particles prior to incorporation into the aggregates. The superabrasive grits are particularly suitable for coating. Typical metallurgical coatings include nickel, titanium, copper, silver and alloys and mixtures thereof.

In general, the size of the abrasive grit particles lies in the microparticle range. It should be noted that the abrasive grit particles can be formed of abrasive aggregates of smaller particles such as abrasive aggregates nanoparticles, though more commonly the abrasive grits are formed of single particles within the microparticle range. For instance, a plurality of nano-sized diamond particles may be aggregated together to provide a microparticle of diamond grit. The size of the abrasive grit particles can vary depending upon the type of grit particles being used. For example, in certain embodiments of the present disclosure, diamond grit particles are preferably used having a size of about 0.5 to 2 microns, such as about 1 micron. In other embodiments of the present disclosure, silicon carbide grit particles are preferably used having a size of about 3 to about 8 microns. In still other embodiments of the present disclosure, aluminum oxide grit particles are preferably used having a size of about 3 to about 5 microns.

The abrasive grit particles may, in general, constitute between about 0.1% to about 85% of the aggregates. The aggregates more preferably include between about 10% to about 50% of the abrasive grit particles.

In one embodiment according to the present disclosure, abrasive aggregates may be formed using a single size of abrasive grit particle, the size of the grit particle and the resultant aggregates both being tailored to the desired polishing application. In another embodiments, mixtures of two or more differently sized abrasive grit particles may be used in combination to form abrasive aggregates having advantageous characteristics attributable to each of the grit particle sizes.

The abrasive aggregates according to the present disclosure also include a nanoparticle binder material as stated above. The nanoparticle binder generally forms a continuous matrix phase that functions to form and hold the abrasive grit particles together within the abrasive aggregates in the nature of a binder. In this respect, it should be noted that the nanoparticle binder, while forming a continuous matrix phase, is itself generally made up of individually identifiable nanoparticles that are in intimate contact, interlocked and, to a certain extent, atomically bonded with each other. However, due to the green, unfired state of the thus formed aggregates, the individual nanoparticles are generally not fused together to form grains, as in the case of a sintered ceramic material. As used herein, description of nanoparticle binder extends to one or multiple species of binders.

While the grit material is believed to act as the primary abrasive, the nanoparticle material can also act as a secondary abrasive in some embodiments of the aggregates of the present disclosure. The size and polishing characteristics of the aggregates may be adjusted by varying parameters such as the composition of the nanoparticle binder material, the relative concentration ratio of nanoparticle binder material to abrasive grit particle, and the size of the abrasive grit particles. The nanoparticle binder material may itself comprise very fine ceramic and carbonaceous particles such as nano-sized silicon dioxide in a liquid colloid or suspension (known as colloidal silica). Nanoparticle binder materials may also include, but are not limited to, colloidal alumina, nano-sized cerium oxide, nano-sized diamond, and mixtures thereof. Colloidal silica is preferred for use as the nanoparticle binder in certain embodiments of the present disclosure. For example, commercially available nanoparticle binders that have been used successfully include the colloidal silica solutions BINDZEL 2040 BINDZIL 2040 (available from Eka Chemicals Inc. of Marietta, Ga.) and NEXSIL 20 (available from Nyacol Nano Technologies, Inc. of Ashland, Mass.).

Before the mixture is spray dried to form the aggregates, the mixture may include an amount of nanoparticle binder material ranging between about 0.1% to about 80%, preferably ranging between about 10% to about 30% on a wet basis. In the formed abrasive aggregates, the nanoparticle binder material may constitute between about 1% to about 90% of the aggregates, preferably between about 20% to about 80% of the aggregates, and most preferably between about 50% to about 75% of the aggregates, all on a dry weight basis.

The slurry for forming the abrasive aggregates also can advantageously include another material which serves primarily as a plasticizer, also known as a dispersant, to promote dispersion of the abrasive grit within the thus formed aggregates. Due to the low processing temperatures used, the plasticizer is believed to remain in the thus formed aggregates, and has been quantified as remaining by thermal gravimetric analysis (TGA). The plasticizer might also assist in holding together the grit particles and nanoparticle binder material in an aggregate when the mixture is spray dried.

Figure 7:
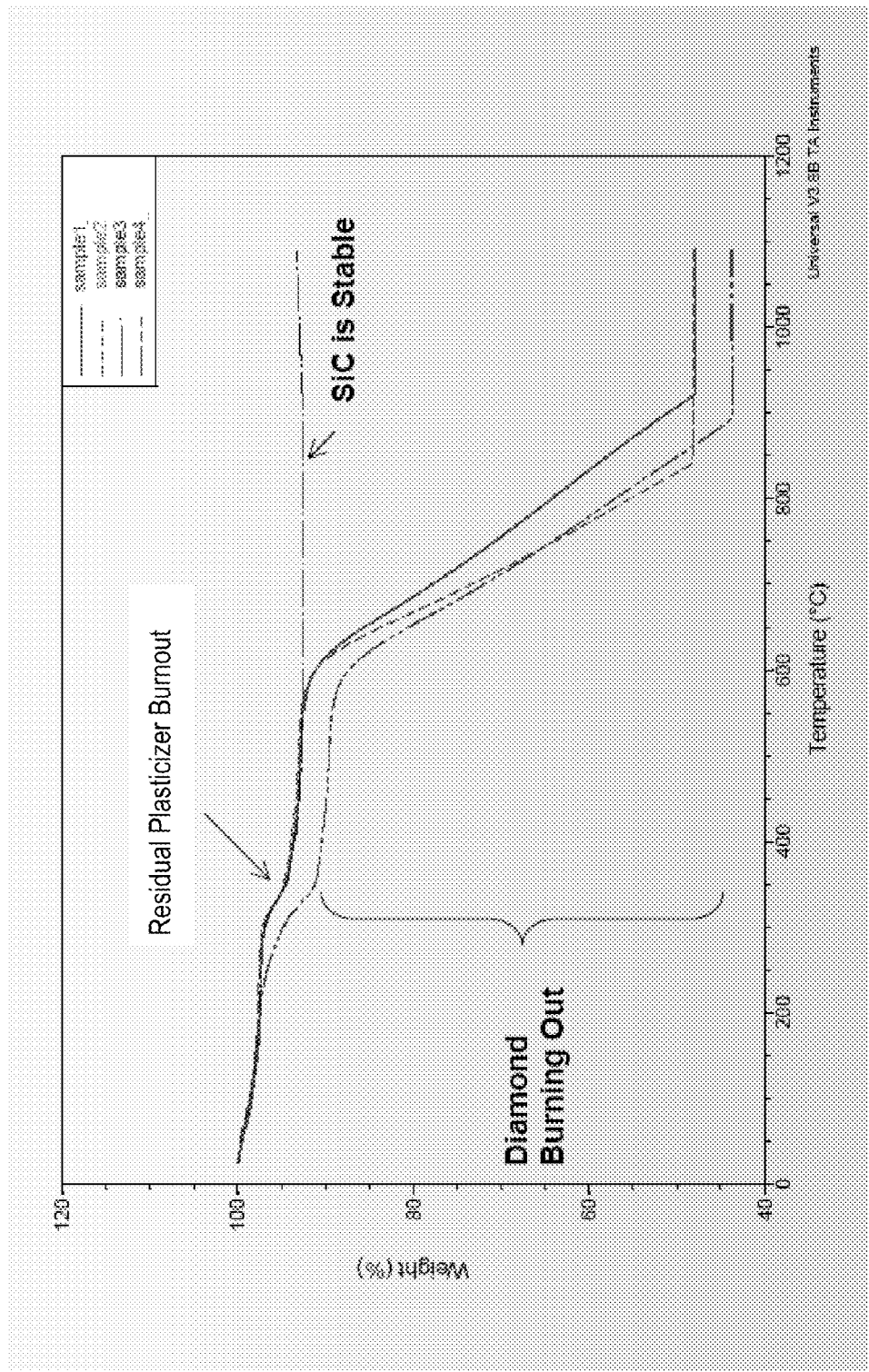
FIG. 7 represents the results of Thermal Gravimetric Analysis (TGA) of examples according to embodiments.

In this respect, FIG. 7 shows the results of TGA analysis on both SiC containing aggregates and diamond containing aggregates, showing residual plasticizer removal from 250° C. to about 400° C. Of note, the diamond was found to burn out at high temperatures. It bears noting that the TGA analysis was done purely as a characterization tool, and the elevated temperatures to which the aggregates were exposed was not part of the process flow for forming aggregates.

Plasticizers include both organic and inorganic materials, including surfactants and other surface tension modifying species. Particular embodiments make use of organic species, such as polymers and monomers. In an exemplary embodiment, the plasticizer is a polyol. For example, the polyol may be a monomeric polyol or may be a polymeric polyol. An exemplary monomeric polyol includes 1,2-propanediol; 1,4-propanediol; ethylene glycol; glycerin; pentaerythritol; sugar alcohols such as malitol, sorbitol, isomalt, or any combination thereof, or any combination thereof. An exemplary polymeric polyol includes polyethylene glycol; polypropylene glycol; poly (tetramethylene ether) glycol; polyethylene oxide; polypropylene oxide; a reaction product of glycerin and propylene oxide, ethylene oxide, or a combination thereof, a reaction product of a diol and a dicarboxylic acid or its derivative; a natural oil polyol; or any combination thereof. In an example, the polyol may be a polyester polyol, such as a reaction products of a diol and a dicarboxylic acid or its derivative. In another example, the polyol is a polyether polyol, such as polyethylene glycol, polypropylene glycol, polyethylene oxide, polypropylene oxide, or a reaction product of glycerin and propylene oxide or ethylene oxide. In particular, the plasticizer includes polyethylene glycol (PEG).

The plasticizer, notably polyethylene glycols, can have a range of molecular weights. Suitable molecular weights lie within a range of about 10 to 3000, such as 50 to 1000, 50 to 500, or 50 to 400. PEG 200 has been found to be a particularly useful plasticizers according to certain embodiments of the present disclosure. Plasticizer concentrations in the mixture, before spray drying, may range between about 0.5% to about 40%, and preferably between about 0.5% to about 5%.

As should be clear, the composition used for forming the aggregates contains major species of abrasive grit, nanoparticle binder, and oftentimes a plasticizer. These species may be present in various relative contents in the composition for forming the aggregates. The relative solids content in the aggregates should mirror the solids content in the composition for forming the aggregates, though the final content of the plasticizer may be altered due to drying/volatilization during the spray drying process, though TGA analysis as shows plasticizer retention in the aggregates. The composition may include about 0.1 to about 85 weight percent of the abrasive grit particles, from about 0.1 to about 80 weight percent of the nanoparticle binder, and from about 0.5 to about 40 weight percent of the plasticizer, weight percents based on the total solids content of the composition. In certain embodiments, the composition can contain about 10 to 50 weight percent abrasive grit particles, about 50 to 90 weight percent nanoparticle binder, and about 0.5 to 15 weight percent plasticizer. Particular embodiments s about 15 to 40 weight percent abrasive grit particles and about 60 to 85 weight percent nanoparticle binder.

A volatile liquid is also included in the composition, which acts as a carrier and serves to liquefy or fluidize the mixture of the abrasive grit particles, the nanoparticle binder material, and the plasticizer, so that the mixture may be flowed into a spray dryer, nebulized into fine aggregate droplets, and dried therein. Preferably, the volatile liquid carrier is deionized water, although other volatile liquids may be used that will be driven off by typical spray drying temperatures and do not substantially alter the composition of the mixture. The liquefied mixture may include the abrasive grit particles, the nanoparticle binder material, and a plasticizer, the balance being a volatile liquid. The composition, in the form of a slurry, can be water-based and can include between about 7.5% to about 15% abrasive grit particles, between about 2.5% to about 7.5%, and between about 0.5% to about 1.5% plasticizer, percents based on total weight of the slurry.

During processing, it should be noted that in certain embodiments according to the present disclosure, it is preferred to substantially remove any accumulated static charges from the grit particles prior to their addition to the mixture. It has been observed that the stability of the aggregates formed in the spray drying step is substantially improved if the grit particles are substantially free of accumulated Coulombic charges. Once well mixed, the liquefied mixture, including the components of the abrasive grit particle, the nanoparticle binder material, and the plasticizer, is then processed in a spray dryer in order to form the abrasive aggregates.

Various spray drying apparatuses may be used, including a rotary atomizer, a single fluid nozzle atomizer, and a two-fluid nozzle atomizer. For mixtures having relatively smaller abrasive grit particles, and for forming relatively smaller aggregates, the spray dryer is preferably a rotary atomizer. For mixtures having relatively larger abrasive grit particles, particularly those larger than about 80 microns, and for forming relatively larger aggregates, particularly those larger than about 90 microns, a single fluid or two-fluid nozzle atomizer may be preferred.

The spray dryer apparatus will typically include at least two material collection points, one at the cyclone and one at the bottom of the main drying chamber. Aggregates formed according to the present disclosure can be collected from both locations; however, the aggregates collected from cyclone have been observed generally be smaller in size and lighter in weight while the aggregates collected from the main drying chamber have been observed to generally be larger in size and heavier in weight. Aggregates collected from the cyclone of the dryer have been observed to typically have a size of from about 5 to about 25 microns. On the other hand, aggregates collected from the main drying chamber have been observed to typically have a size of from about 20 to about 100 microns.

To commence spray drying, the slurry is pumped into the spray dry apparatus at a generally constant rate. The slurry then passes through an atomizer or nebulizer inside the spray dryer to form generally spheroidal droplets. While passing through the atomizer, these droplets are caught up in a vortex of hot air, in which the liquid portion of the slurry essentially instantly evaporates and the solid portion of the slurry forms an aggregate. The hot air that volatilizes the liquid fraction of the slurry, leaving behind solid particles, is typically not greater than 400° C., such as not greater than 375° C., 350° C., or 300° C. Typically, spray drying is carried out at a temperature greater than about 80° C., such as greater than about 90° C. Particular embodiments have been carried out at temperatures of about 90° C. to about 250° C. It is noted that dwell times within the high temperature portion of the spray dryer are generally limited to seconds, such as 0.5 to 10 seconds, which is in stark contrast to typically heat treatment dwell times associated with sintering, calcination, or firing of typical ceramic products.

When the slurry enters the vortex of hot air the liquid is substantially driven off and the mixture is formed into a fine powder including numerous aggregates, each abrasive aggregate being generally spheroidal in shape. As used here in the term "spheroidal" refers to aggregates having a spherical shape, or a generally spherical shape, including ellipsoids and other spherical permutations, which are a consequent result of the spray drying process. Thus, spheroids include spheres, ellipsoids, truncated spheres and ellipsoids, but all generally have a rounded rather than blocky structure. As should be clear, the aggregates each contain the abrasive grit particles bound together by the nanoparticle binder material and any residue of the plasticizer that has not been evaporated. The final moisture content of the aggregates, the spray drying step, is generally from about 1 to about 3 percent by weight.

Advantageously, according the present disclosure, no further processing steps that notably modify the composition or morphology of the as-formed, unfired, green spray dried aggregates are required in order to produce usable abrasive aggregates. In fact, according to certain embodiments of the present disclosure, the method for making the aggregates consists essentially of only the aforementioned mixing and spray drying steps, and quite notably, heat treatment steps that would affect the morphology of the aggregates are avoided. In particular, no step is carried in which the materials are heated to extremely high temperatures in the range of from about 500° C. to 1000° C. or more in order to melt, sinter, or otherwise fuse the silica or other nanoparticle binder in the mixtures. Thus, in certain embodiments according to the present disclosure, all of the steps of the method of making the aggregates may be carried at temperatures of about 400° C. or less.

This stands in contrast to conventional processes for making abrasive powders with aggregated particles which typically require a sintering step at very high temperatures of from about 500° C. to 1000° C. or more.

Although the aggregates are not believed to require a sintering or other similar high temperature treatment, the formed aggregates have been found to be highly durable. In particular, it has been observed that, once formed, the aggregates are resistant to dissolution in a wide variety of chemical solvents including methyl ethyl ketone (MEK), isopropyl alcohol (IPA), and 1,4-dioxane.

Once formed, the aggregates may be classified, or separated into various size ranges as desired before being applied to a substrate or otherwise utilized in a polishing operation. In addition to the abrasive aggregates, the resultant powder may include an amount of material smaller than the desired grain size. The particulate material composed of the thus formed aggregates generally has an average particle size within a range of about 10 to 150 microns. Typically, the material has an average particle size not less than about 20, such as not less than about 25 microns. Upper limits for average particle size are driven by process constraints and particular end use applications, and generally the material has an average particle size not greater than about 100 microns, such as not greater than about 90, 80, or even not greater than 70 microns. In certain embodiments, the average particle size of the aggregate material is preferably between about 20 microns and 50 microns. The size, and the size range, of the aggregates may be adjusted and may depend on many factors, including the composition of the mixture and the spray dryer feed rate. For example, abrasive aggregates of sizes including those of approximately 10 microns. 20 microns, 35 microns, 40 microns, and 45 microns have been successfully produced using a rotary atomizing spray dryer. These aggregates have included abrasive grit particles ranging from about 5 to about 8 microns.

Figure 4:
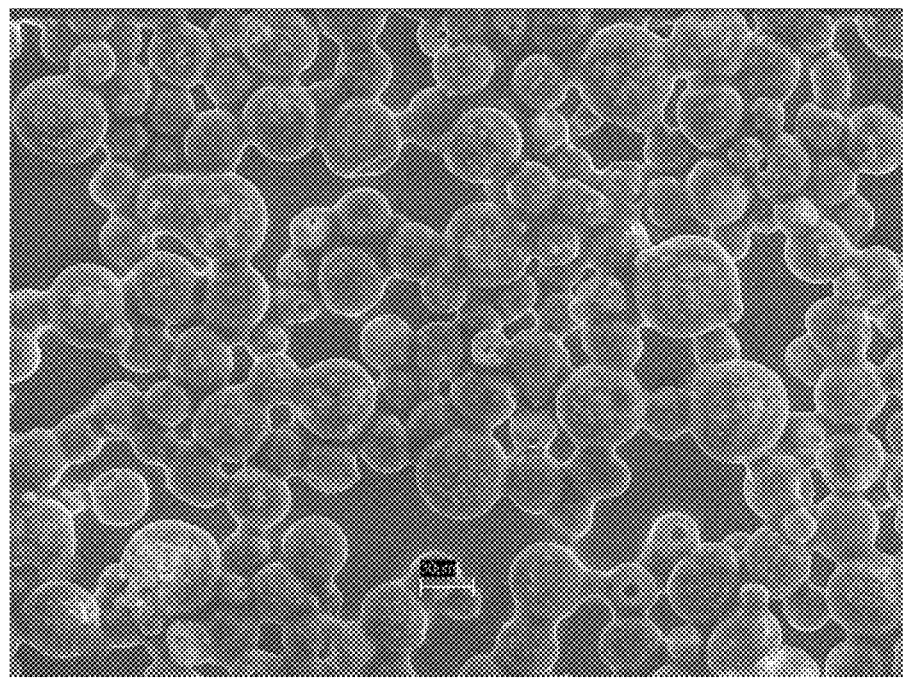
FIGS. 4-6 are photomicrographs taken with a scanning electron microscope showing abrasive aggregates including silicon carbide grit combined with silica nanoparticles in a coating on a substrate according to another embodiment of the present disclosure.
Figure 5:
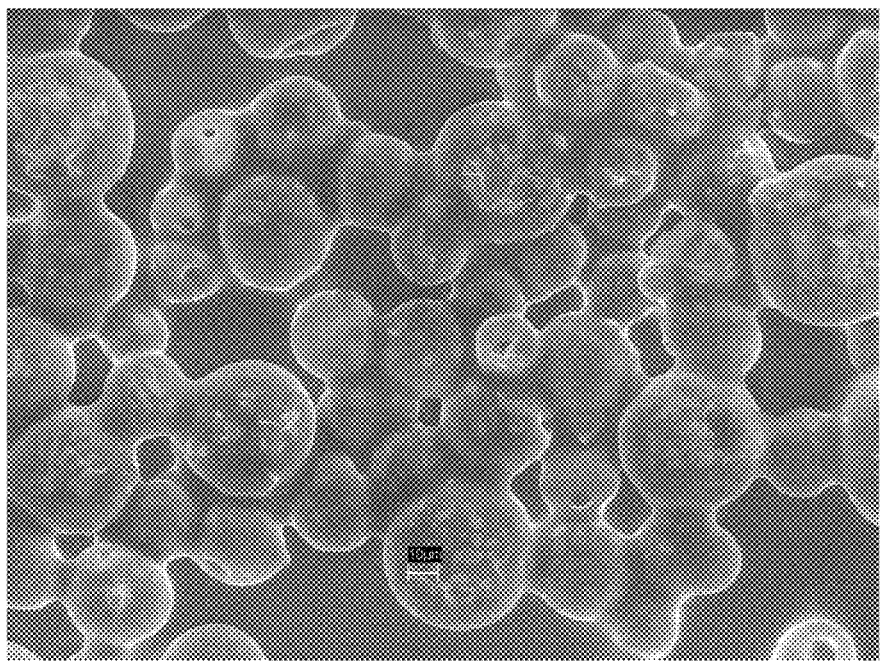
Figure 6:
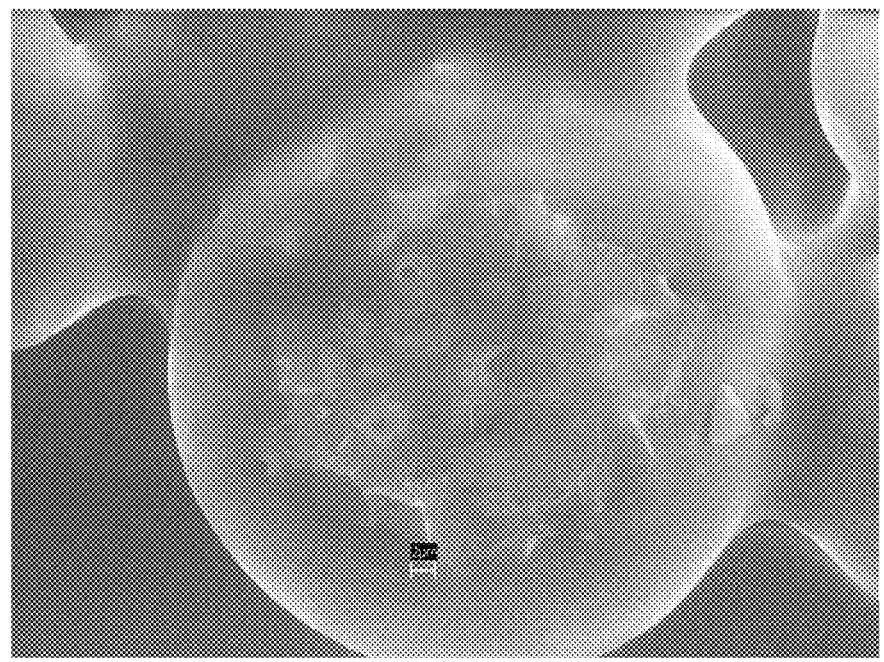

When viewed under magnification, the aggregates have a generally spheroidal shape, being characterized as rounded or spherical as seen in the scanning electron micrographs of FIGS. 4-6. In some instances, however, the aggregates may be observed to have an void near the center of the aggregate and thus exhibit a more toroid- or torus-like shape as seen in the scanning electron micrographs of FIGS. 1-3. Individual particles of the abrasive grit material, such a diamond grit, may be observed to be dispersed over the surface of the aggregates and within the interior thereof, with relatively few instance of the individual grit particles clumping together on the surface of the aggregate. It is noted that FIGS. 1-6 show dispersed, individual aggregates that are bound together in a resin binder system.

Further study of the abrasive aggregates has revealed that certain embodiments are composed of hollow spheroids. Such particles can be analogized to thick-shelled racquet balls, having a wall thickness $t_w$ within a range of about 0.08 to 0.4 times the average particle size of the aggregates. Process parameters and compositional parameters can be modified to effect different wall thicknesses, such as wall thicknesses not less than about 0.1, 0.15 times the average particle size of the aggregates. Upper limits for wall thickness may be on the order of 0.35, 0.30, 0.25, or 0.20 times the average particles size of the aggregates.

Additional studies show that specific surface areas (SSA) are generally greater than 2 $m^2/g$, such as greater than 10 $m^2/g$, greater than 10 $m^2/g$, or greater than 15 $m^2/g$. Maximum SSA has been observed to be not greater than 150 $m^2/g$, such as not greater than 100 $m^2/g$.

Once formed, the abrasive aggregates can be used 'as-is' with suitable classification to refine particle size distribution. While post-synthesis process steps such as excessive heat treatment are avoided, such that the aggregates are used in a green, unfired state, the aggregates can be coated with a metallurgical coating, in much the same fashion that individual abrasive grits can be coated. Metallurgical coatings nickel, titanium, copper, silver and alloys and mixtures thereof.

Once produced, the abrasive aggregates may be used directly as a loose or 'free' abrasive powder. In this context, the abrasive powder formed from the aggregates may be used as either a dry powder or a powder which has been wetted with a liquid such as water to create a slurry for improved performance. The abrasive powder may also be incorporated into a polishing paste or gel. The abrasive powder so produced may advantageously be used for the finishing and/or polishing of numerous other materials such as chemical mechanical planarization (CMP) used in the semiconductor industry, fine surface finishing of various materials, and polishing both natural and artificial dental materials. Alternatively, the aggregates are configured into a fixed abrasive, a term that broadly includes coated and bonded abrasive products.

In other embodiments of the present disclosure, however, the abrasive aggregates are preferably combined with a resin material used to adhere the aggregates onto a surface of a substrate. Processes for combining the aggregates with the resin bonding material include slurry formation, in which the aggregates, resin and other additives are combined together and coated on a substrate, or in a distinct processing pathway, aggregates are placed on a resin coated substrate through electrostatic attraction or simply through gravity (e.g., sprinkled on the substrate). The latter approach is well understood in the art, generally first depositing a 'make coat' on the substrate, aggregate application on the make coat, and subsequent deposition of a 'size coat.' Optionally, a supersize coat may be deposited over the size coat. Further, a compliant coat may be disposed between the make coat and the substrate. In another example, a back coat may be disposed over the substrate on a side opposite the make coat.

In connection with slurry coating a substrate, in addition to the aggregates, the slurry generally also includes a solvent such as water or an organic solvent and a polymeric resin material. Suitable polymeric resin materials include polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. Most preferably, the resin is a polyester resin. The slurry may additionally comprise other ingredients to form a binder system designed to bond the aggregate grains onto a substrate. The slurry composition is thoroughly mixing using, for example, a high shear mixer.

The slurry containing the aggregate grains is preferably applied to the substrate using a blade spreader to form a coating. Alternatively, the slurry coating may be applied using slot die, gravure, or reverse gravure coating methods.

The coating thickness may range from about 1 to about 5 mils in thickness, after drying. As the substrate is fed under the blade spreader at a desired coat speed, the aggregate grain slurry is applied to the substrate in the desired thickness. The coat speed is preferably between about 10 to about 40 feet per minute.

The coated substrate is then heated in order to cure the resin and bond the aggregate grains to the substrate. In general, the coated substrate is heated to a temperature of between about 100° C. to less than about 250° C. during this curing process. In certain embodiments of the present disclosure, it is preferred that the curing step be carried at a temperature of less than about 200° C.

Once the resin is cured and the aggregate abrasive grains are bonded to the substrate, and the coated substrate may be used for a variety of stock removal, finishing, and polishing applications.

In an alternative embodiment of the present disclosure, the abrasive aggregates may be directly incorporated into the substrate. For instance, the aggregates may be mixed a polyester resin and this mixture of aggregates and polymer may then be formed into a substrate.

In a still alternative embodiment of the present disclosure, the abrasive aggregates may be applied to a substrate coated with an adhesive and then sealed. This coating technique is similar that typically used for traditional sandpaper, and is referenced above. In this embodiment, the abrasive aggregates are preferably not mixed into a slurry. Instead the abrasive powder containing the aggregates is preferably fed onto a substrate to which an adhesive has already been applied, the make coat, followed by sealing via the size coat. Optionally, the substrate may be pre-treated with a compliant coat or a back coat.

In an alternative embodiment of the present disclosure, the abrasive aggregates could be applied to substrates or other materials by electroplating, electric-static, spray coating and spray powder coating methods.

The abrasive-coated substrate may them be used as a lapping film or a micro-finishing film for finishing and/or polishing other materials. Substrate materials which may be coated in this manner include, but are not limited to, polyester, polyurethane, polypropylene, polyimides such as KAPTON from DuPont, non-woven materials, woven materials, paper, and metals including foils of copper, aluminum, and steel. Polyester films are particularly preferred as the substrate material is certain embodiments of the present disclosure. Suitable substrates may have a thickness, before being coated, of from about 1 to about 14 mils.

Further, the abrasive aggregates may also be incorporated into bonded abrasives, such as diamond grinding wheels and other grinding wheels. Bonded abrasives may also used to provide high traction, non-slip materials which may be applied, for example, to ladder rungs. Here, typically bonded abrasives are three dimensional structures rather than the generally planar structure of a coated abrasive, and includes a 3 dimensional matrix of bonding material in which the aggregates are embedded. That is, the bond material fixes position of the aggregates with respect to each other, and is present as an inter-agglomerate phase. While bonded abrasives utilize a wide variety of bonding agents, such as resin, glass, and metals, certain agents such as glass and metal bond materials require high temperature processing. Accordingly, to preserve the green structure of the aggregates, generally resin systems are used that do not require high cure temperatures, or which can be cured with actinic radiation such as UV.

In one embodiment according to the present disclosure, the abrasive product may be used for finishing and polishing telecommunications cables, particularly fiber optic cables. Fiber optic cables are capable of transmitting vast amounts of data at very high speed in the form of light pulses. To allow these light pulses to be effectively transmitted between interconnected fiber optic cables or between a fiber optic cable and a connected electronic device, however, the ends of the fiber optic connectors must be cleanly cut or cleaved and then highly polished to produce an extremely smooth surface and appropriate tip geometry. Abrasive substrate film produced according to the present disclosure and generally cut into disk or sheet form may be used for this purpose and have been observed to be highly effective for the polishing of the ends of fiber optic connectors.

When used for polishing fiber optic connectors, the abrasive substrate films are preferably produced from aggregates formed from diamond grit combined with silica nanoparticle binder. The grit particles preferably have a size of about 1 micron, and the overall size of the aggregates is preferably from about 30 to about 80 microns. These aggregates are preferably bonded to a polyester film substrate. Polishing of the fiber optic connector ends may be carried out on a fiber optic polishing machine. A suitable 12 connector polishing machine is available from Domaille Engineering of Rochester, Minn. and may be used with the abrasive substrate films of the present disclosure for polishing fiber optic connectors at, for example, a speed of about 60 rpm and with an applied pressure of about 8 psi.

In another embodiment according to the present disclosure, the abrasive product may be used for stock removal, finishing and polishing hard metal surfaces such as steel. When used for polishing metal surfaces, the abrasive substrate films are preferably produced from aggregates formed from diamond grit combined with a silica nanoparticle binder. The grit particles preferably have a size of about 1 micron, and the overall size of the aggregates is preferably from about 30 to about 80 microns. These aggregates are preferably bonded to polyester film substrate. Using this abrasive product, polishing of the surfaces may be carried out, for example, using a Struers metal polishing machine (available from Struers, Inc. of Westlake, Ohio) operating at a speed of 600 rpm and with an applied force of 15 newtons. Alternatively, hard metal surfaces may also be polished using abrasive aggregates formed from silicon carbide grit combined with silica.

In another embodiment according to the present disclosure, the abrasive product may be used for stock removal, finishing and polishing softer metal surfaces such as copper or brass. When used for polishing metal surfaces, the abrasive substrate films are preferably produced from aggregates formed from diamond grit combined with a silica nanoparticle binder. The grit particles preferably have a size of about 3 to 5 microns, and the overall size of the aggregates is preferably from about 30 to about 80 microns. These aggregates are preferably bonded to polyester film substrate. Using this abrasive product, polishing of the surfaces may be carried out, for example, using a Struers metal polishing machine (available from Struers, Inc. of Westlake, Ohio) operating at a speed of 150 rpm and with an applied force of 45 newtons. Alternatively, soft metal surfaces may also be polished using abrasive aggregates formed from silicon carbide grit combined with silica.

In still another embodiment according to the present disclosure, the abrasive substrate may be used for finishing and polishing coated surfaces, such as painted surfaces. In particular, the abrasive substrate film may be used to buff or polished painted automotive surfaces. When used for polishing painted automotive surfaces, the abrasive substrate films are preferably produced from aggregates formed from silicon carbide grit embedded within a silica nanoparticle binder. The grit particles preferably have a size of from about 3 to about 8 microns, and the overall size of the aggregates is preferably from about 30 to about 50 microns. These aggregates are preferably bonded to a polyester film substrate.

Other embodiments can particularly include finishing in dental applications. Here, an abrasive product such as a coated abrasive, containing green, unfired aggregates as described herein can be utilized quite successfully for finishing tooth and dental prosthetics.

Typically the polishing of materials such as those described above is carried out in a multi-step, incremental process. The surface is first polished with a relatively coarse abrasive material and then polished again with a somewhat finer grit abrasive material. This process may be repeated several times, which each successive re-polishing being carried out with a progressively finer grit abrasive until the surface is polished to the desired degree of smoothness. This type of multi-step polishing procedure has conventionally been required as typically the grains of an abrasive must be on the same scale as the size of the scratches which they are to remove. Certain polishing protocols use successively finer products having a grit size, and attendant Ra (with respect to both the abrasive product and on the workpiece post-machining step) reduced by a factor of three. That is, successively finer products are generally limited to reduction by a factor of three (e.g., from 9 micron, to 6 micron, to 3 micron grit sizes), in order to ensure defect removal from the preceding machining step.

In contrast to the conventional multi-step procedure, however, it has been quite surprisingly and unexpectedly observed that a wide variety of workpieces, from materials such as fiber optic connectors, metals surfaces, and painted automotive surfaces, and dental prosthetics, may be polished in a single step process using single, rather than multiple abrasive product, such as a coated abrasive product according to the present disclosure. This result is quite surprising and highly advantageous. It is been observed that when abrasive substrates according to the present disclosure are used, the entire polishing may be carried out using only one abrasive. This results in a considerable reduction in the time needed to achieve a desired degree of polishing smoothness, as well as marked reduction in costs.

Without being bound by theory, it is believed that the advantage may be derived from the unique properties observed in the aggregates of the present disclosure. The average roughness, or $R_a$, of a surface is a measure of the degree of variations in the overall height profile of a surface. A lower roughness value is generally indicative of a surface which is smoother and has smaller variations in overall height between differing locations on the surface. When the roughness value of abrasive materials is measured, the roughness values observed can typically be correlated to the average size of the abrasive particles. For example, with conventional diamond grit abrasives, the size of the diamond grit and the expected roughness values for the abrasives are typically as follows:

| Diamond grit size (microns) | Typical roughness value ($R_a$) (microns) |
| --- | --- |
| 30 | 2.5 |
| 15 | 1.6 |
| 9 | 1.0 |
| 6 | 0.8 |

| Diamond grit size (microns) | Typical roughness value ($R_a$) (microns) |
|---|---|
| 3 | 0.6 |
| 1 | 0.3 |

To finish or polish a surface to a desired final maximum roughness (i.e. to a desired final minimum degree of smoothness), conventionally an abrasive must be employed having a corresponding maximum degree of roughness.

The aggregates of the present disclosure, however, have been observed have a roughness value in excess of what would typically be expected for a grit particle having a comparable size. Thus, while a typical 30 micron diamond grit particle would generally have a roughness values of about 2.5 microns (as noted above), 30 micron aggregates formed from 1 micron diamond grit and a silica nanoparticle binder according to the present disclosure have been observed to have a roughness value of from about 5 to about 6 microns.

Even more surprisingly, despite this high roughness value, it has been observed that these same aggregates according to the present disclosure may be used for the fine polishing of surfaces. A finished surface smoothness corresponding to a roughness value of well below 1 micron may be achieved using the aforementioned diamond grit and silica aggregates which, again, have been measured to roughness values of from about 5 to about 6 microns. Conventionally, a grit particle having a size of about 1 micron or less would be required to polish a surface to this degree of smoothness.

More concretely, based upon testing of numerous embodiments, it has been found that initial surface roughness of a work piece can be machined and polished in a single step, utilizing a single abrasive product, well beyond the capability of a conventional single abrasive product. For example, for a workpiece having an initial surface roughness $Ra_i$, embodiments herein have shown the capability of reducing the initial surface roughness $Ra_i$ to a final surface roughness as a result of abrading the workpiece, the final surface roughness $Ra_f$ being not greater than $0.2 Ra_i$, such as not greater than $0.1 Ra_i$. The foregoing achievement in the reduction of surface roughness by utilizing a single product bears notable attention, as state of the art abrasive products are generally quite limited in surface roughness reduction utilizing a single product. Indeed, surface roughness reductions have been measured to values not greater than $0.5 Ra_i$, and even not greater than about $0.01 Ra_i$, representing a notable 2 order of magnitude reduction in surface roughness Ra.

While it is not completely understood as to the precise reasons why embodiments herein have demonstrated such machining efficacy, oftentimes spanning more than one order of magnitude reduction in Ra on a work piece, it is theorized that the present green, unfired aggregates having notable composite structure is responsible for machining through complementary simultaneous pathways. For example, it is believed that the aggregate size is responsible for large defect reduction (e.g., removal of 6 to 7 micron scratches in a work piece). Meanwhile, the primary abrasive grit is believed to be responsible for simultaneous reduction in medium sized defects, driving the Ra value of the workpiece even further downward. And moreover, it is believed that the nanoparticle binder contributes to ultra-fine polishing of the workpiece, driving Ra values of the workpiece down into the nanometer regime, such as on the order of 10 to 20 nanometers, observed for certain work pieces.

It is emphasized that the green, unfired state of the aggregates contributes to the notable machining efficacy described above. By maintaining the aggregates in the green, unfired state, it is understood that the nanoparticle binder, while composed of particles interlocked and to some extent atomically bonded together, nevertheless retains the desirable ultra-fine polishing properties of the nanoparticle particles, which properties would be destroyed through higher temperature heat treatment. That is, the multi-action nature of the aggregates is maintained through controlled process conditions, notably preventing the aggregates from being exposed to high temperatures over any sort of notable duration. Here, it is noted that it is likely not just temperature alone, but also dwell time which would be responsible for high temperature aggregate degradation. For example, during spray drying, droplets containing the solids fraction forming the aggregates are typically exposed to elevated temperatures, such as up to about 400° C., for a mere few seconds, while conventional high temperature ceramic processes such as sintering, calcination or the like generally utilize dwell times on the order of 15 minutes to multiple hours. Accordingly, it is feasible that the aggregates according to the present embodiments may maintain their green state even upon exposure to elevated temperatures, provided that such elevation is restricted to the order of seconds. Such would be the case to the extent that higher temperatures for spray drying processes were utilized.

It is also noted, that based on comparative testing, incorporation of a plasticizer in the slurry composition can be highly result effective. More specifically, in testing of diamond/colloidal silica containing aggregates, removal of plasticizer had a notable, negative impact. The plasticizer helps maintain dispersion of the abrasive grits in suspension or slurry form, and stabilizes the suspension during processing. Upon spray drying, it was observed that the abrasive grits remain very well distributed. When the plasticizer is removed from the slurry composition, the resultant aggregates at first appeared not different, and had requisite green strength for handling. However, upon deployment into an abrasive product, machining results were poor, with observed aggregate failure. Without wishing to be bound by any particular theory, it is believed that the plasticizer enable the formation of a more structurally sound aggregate, by maintaining grit dispersion in the slurry and uniform distribution in the aggregate. In contrast, comparative examples absent plasticizer had localized clumps of grits, forming a weak area of the aggregate, subject to failure upon application of working pressures.

Figure 8:
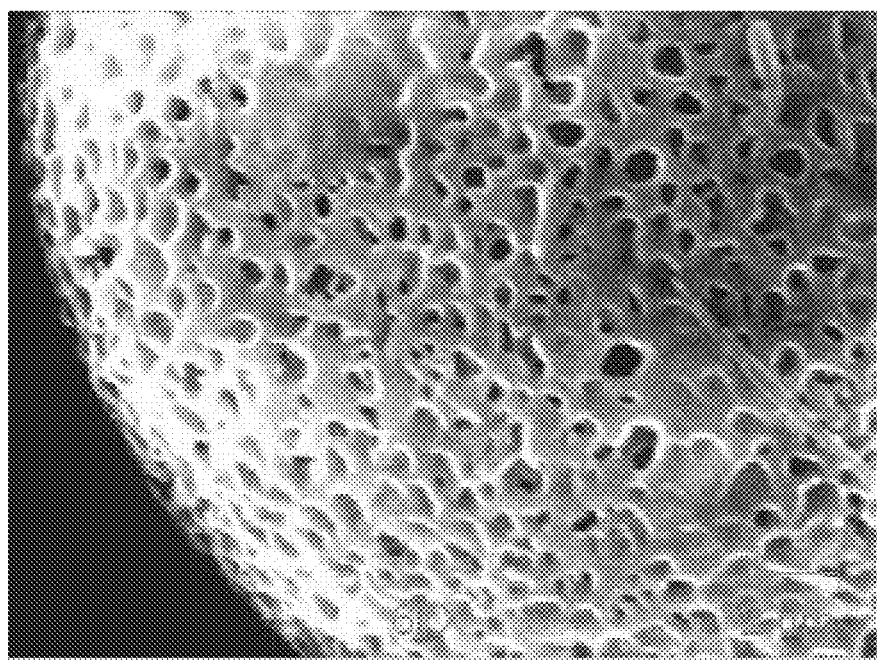
FIG. 8 shows the consequence of post-synthesis heat treatment of diamond containing aggregate corresponding to an embodiment.
Figure 9:
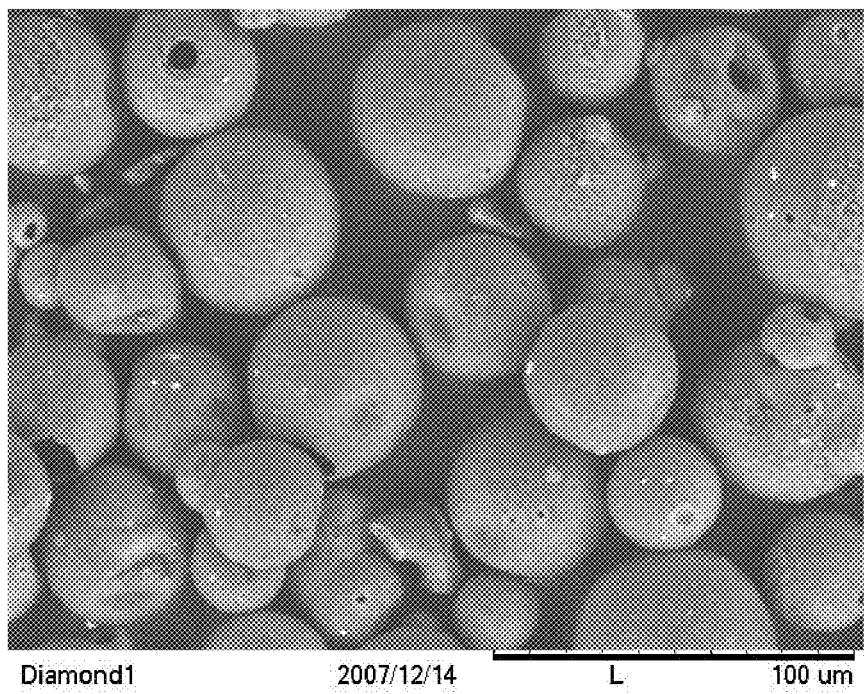
FIGS. 9-16 show various aggregates formed in accordance with different formulations or processing parameters.

The uniform distribution of aggregates can easily be seen in FIG. 8, which is an example that was exposed to TGA described above, showing diamond grit burnout due to high temperature volatilization. The void areas shown in FIG. 8 illustrate diamond grit positions. It is also noted that the material left behind, heat treated nanoparticle binder, clearly forms a self supporting, continuous matrix. Of course, in the high temperature form shown in FIG. 8, the particulate nature of the binder has been lost due to grain growth and sintering.

A further advantage may be found in the surprising durability of abrasives made from the aggregates of the present disclosure. Abrasives typically wear down and gradually lose their effectiveness in removing stock material from a surface being polished or finished with the abrasive. Abrasives incorporating the aggregates of the present disclosure, however, have been observed to have significantly improved durability as compared to conventional abrasives materials. When used in comparable applications, abrasives incorporating the aggregates of the present disclosure have been observed to retain their effectiveness for more than twice as long as conventional abrasive materials, and in some instances, up to 20 times as long.

The properties and advantage of the present disclosure are illustrated in further detail in the following nonlimiting examples. Unless otherwise indicated, temperatures are expressed in degrees Celsius, and concentrations are expressed in weight percentages based upon the overall dry weight of the abrasive aggregates.

EXAMPLE 1

A powder of fine abrasive aggregates including diamond grit combined with silica nanoparticles was produced by the following method. An aqueous colloidal silica was mixed with diamond grit having an average particle size of 1.1 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution was used having about 40% silica ($SiO_2$) by weight, a silica particle size of about 20 nm, and a base-stabilized pH of about 10. The components were mixed in the following amounts:

| Component | Pounds in mixture |
| --- | --- |
| Diamond grit | 6.6 |
| BINDZIL 2040 silica sol | 13.2 |
| PEG 200 | 0.9 |
| Deionized water | 45 |

The components were thoroughly mixed using a high shear mixer to provide a uniform aqueous dispersion having about 20% solids in water.

The mixture was then spray dried using a Niro SD6.3 rotary atomizer spray dryer with an FF-1 atomizer available from Niro, Inc. of Columbia, Md. The mixture was heated and fed into the inlet of the spray dryer at a temperature of about 342° C. The outlet temperature of the spray dryer was measured to be about 152° C. The spray drying process substantially removed the water from the mixture and the remaining components were observed to form a powder of small, generally round aggregates which were collected for analysis. About 85% of the aggregate particles were collected from the dryer cyclone unit and about 15% were collected from the main drying of the spray dryer apparatus. No further sintering or heating was required to form the aggregates.

The aggregates were examined under magnification and observed to be formed of a phase of silica nanoparticles and PEG combined with particles of the diamond grit. The average size of the aggregates collected from the cyclone was measured to be about 20 microns. The average size of the aggregates collected from the main drying chamber was about 40 microns.

EXAMPLE 2

A powder of fine abrasive aggregates including diamond grit combined with silica nanoparticles was produced by the following method. An aqueous colloidal silica solution (BINDZIL 2040) was mixed with diamond grit having an average particle size of 1.0 microns, along with a polyethylene glycol (PEG) 200 plasticizer and deionized water. The components were mixed in the following amounts:

| Component | Pounds in mixture |
| --- | --- |
| Diamond grit | 15.75 |
| BINDZIL 2040 silica sol | 40 |
| PEG 200 | 2.2 |
| Deionized water | 52.5 |

The components were thoroughly mixed using a high shear mixer to provide a uniform aqueous dispersion having about 52% solids in water.

The mixture was then spray dried using the same Niro brand spray dryer. The mixture was heated and fed into the inlet of the spray dryer at a temperature of about 342° C. The outlet temperature of the spray dryer was measured to be about 170° C. The spray drying process substantially removed the water from the mixture and the remaining components were observed to form a powder of small, generally round aggregates. The aggregates produced were collected for analysis with about 50% of the particles being collected from the dryer cyclone unit and about 50% being collected from the main drying of the spray dryer apparatus. No further sintering or heating was required to form the aggregates.

The aggregates were examined under magnification and observed to be formed of a phase of silica nanoparticles and PEG combined with particles of the diamond grit. The typical size of the aggregates was measured to be about 35 to about 45 microns.

EXAMPLE 3

A powder of fine abrasive aggregates including diamond grit combined with silica nanoparticles was produced by the following method. An aqueous colloidal silica solution (BINDZIL 2040) was mixed with silicon carbide grit (NGC 2500, available from Nanko Abrasives, Inc. of Tokyo, Japan) having an average particle size of 8 microns, along with a polyethylene glycol (PEG) 200 plasticizer and deionized water. The components were mixed in the following amounts:

| Component | Pounds in mixture |
| --- | --- |
| Silicon carbide grit | 75 |
| BINDZIL 2040 silica sol | 190 |
| PEG 200 | 10.5 |
| Deionized water | 25 |

The components were thoroughly mixed using a high shear mixer to provide a uniform aqueous dispersion having about 60% solids in water.

The mixture was then spray dried using the same Niro brand spray dryer. The mixture was heated and fed into the inlet of the spray dryer at a temperature of about 342° C. The outlet temperature of the spray dryer was measured to be about 132° C. The spray drying process substantially removed the water from the mixture and the remaining components were observed to form a powder of small, generally round aggregates. About 150 pounds of the aggregates were collected with about 50% of the particles being collected from the dryer cyclone unit and about 50% being collected from the main drying of the spray dryer apparatus. No further sintering or heating was required to form the aggregates.

The aggregates were examined under magnification and observed to be formed of a phase of silica nanoparticles and PEG combined with particles of the silicon carbide grit. The average size of the aggregates was measured to be about 40 microns.

EXAMPLE 4

In this example, a powder of silicon carbide and silica aggregates produced as described in Example 3 above, was coated and bonded to a substrate. In order to apply the aggregate powder to the substrate, a coating slurry was first prepared including the aggregate powder, a polyester resin (VITEL 3301 available from Bostik, Inc. of Wauwatos, Wis.), a crosslinking agent, and methyl ethyl ketone solvent (available from Quaker City Chemicals, Inc. of Philadelphia, Pa.) in the following amounts:

| Component | Pounds in mixture |
| --- | --- |
| Silicon carbide aggregates | 81.6 |
| Polyester resin | 50 |
| Crosslinking agent | 24.9 |
| MEK solvent | 75 |

The composition was mixed in order to provide a substantially uniform slurry mixer.

A roll of MYLAR Type A polyester brand film (available from DuPont) was used as the substrate. The film had a thickness of 3 mils. A coating of the slurry was applied to the upper surface of the substrate film using a blade coating system. The film was advanced through the blade coating station at a rate of 40 feet per minute and the slurry was coated onto the substrate film at an initial thickness of about 3 mils.

As the coated substrate exited the blade coater, the film was advanced through an extended heating unit. The length of the heating section within the unit was about 37 feet and this heating section was maintained at a temperature of about 340° C. The coated will was advanced in the heating unit at a speed of 40 feet per minute. As the coated film passed through the heating unit, the resin in the slurry underwent a crosslinking (i.e. curing) reaction. Upon exiting the heating unit, this reaction was substantially complete and the aggregates were substantially bonded to the substrate film by the crosslinked resin.

The finished, aggregate-bonded substrate film was then allowed to cool and thereafter was cut into a plurality of abrasive discs. The surface profile of an abrasive disc sample was then analyzed using a Mahr profilometer instrument from Mahr Federal Inc. of Providence, R. I. in order to determine the roughness value ($R_a$) of the abrasive disc. The roughness value was measured to be 5.85 microns.

EXAMPLE 5

In this example, a lapping film substrate was coated with a combination of two aggregate powders. The first was a powder made from diamond grit and silica aggregates as described in Example 1 above. The second was a powder made from silicon carbide and silica aggregates produced as described in Example 3 above. In order to apply the aggregate powder to the substrate, a coating slurry was first prepared including the two aggregate powders, a polyester resin (available from Bostik, Inc. of Wauwatos, Wis.), a crosslinking agent, and methyl ethyl ketone solvent (available from Quaker City Chemicals, Inc. of Philadelphia, Pa.) in the following amounts:

| Component | Pounds in mixture |
| --- | --- |
| Silicon carbide aggregates | 15.21 |
| Diamond aggregates | 35.3 |
| Polyester resin | 60 |
| Crosslinking agent | 0.6 |
| MEK solvent | 45 |

The composition was mixed in order to provide a substantially uniform slurry mixer.

A roll of MYLAR Type A polyester brand film was used as the substrate. The film had a thickness of about 3 mils. A coating of the slurry was applied to the upper surface of the substrate film using a blade coating system. The film was advanced through the blade coating station at a rate of 25 feet per minute and the slurry was coated onto the substrate film at an initial thickness of about 2.5 mils.

As the coated substrate exited the blade coater, the film was advanced through an extended heating unit. The length of the heating section within the unit was about 37 feet and this heating section was maintained at a temperature of about 340° C. The coated will was advanced in the heating unit at a speed of 25 feet per minute for a total heating time of about two minutes. As the coated film passed through the heating unit, the resin in the slurry underwent a crosslinking (i.e. curing) reaction. Upon exiting the heating unit, this reaction was substantially complete and the aggregates were substantially bonded to the substrate film by the crosslinked resin.

The finished, aggregate-bonded substrate film was then allowed to cool and thereafter was cut into a plurality of abrasive discs. The surface profile of an abrasive disc sample was then analyzed using a Mahr profilometer instrument in order to determine the roughness value ($R_a$) of the abrasive disc. The roughness value was measured to be 11.13 microns.

EXAMPLE 6

A powder of fine abrasive aggregates including aluminum oxide grit held within silica was produced by the following method. An aqueous colloidal silica was mixed with aluminum oxide grit having an average particle size of 3.27 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution was used having about 40% silica ($SiO_2$) by weight, a silica particle size of about 20 nm, and a base-stabilized pH of about 10. The components were mixed in the following amounts:

| Component | Pounds in mixture |
| --- | --- |
| Alum. Oxide grit | 24 |
| BINDZIL 2040 silica sol | 62 |
| PEG 200 | 3.8 |
| Deionized water | 210 |

The components were thoroughly mixed using a high shear mixer for 15 minutes to provide a uniform aqueous dispersion.

The mixture was then spray dried using the same Niro brand spray dryer. The mixture was heated and fed into the inlet of the spray dryer at a temperature of about 240° C. The outlet temperature of the spray dryer was measured to be about 120° C. The spray drying process substantially removed the water from the mixture and the remaining components were observed to form a powder of small, generally round aggregates. About 15 pounds of the aggregates were collected from the cyclone section during a 1.5 hour run of the spray dryer apparatus. No further sintering or heating was required to form the aggregates.

The aggregates were examined under magnification and observed to be formed of a phase of silica and PEG with particles of the aluminum oxide grit imbedded thereon. The average size of the aggregates was measured using a Microtrack size distribution analysis, using both wet and dry sample methods. The average size was measured to be 17.08 microns by the wet sample method and 19.12 microns by the dry sample method. The final moisture content of the aggregates, after spray drying, was 1.4 weight percent.

EXAMPLE 7

A powder of fine abrasive aggregates including aluminum oxide grit held within silica was produced by the following method. An aqueous colloidal silica solution (BINDZIL 2040) was mixed with an aluminum oxide grit having an average particle size of 3.27 microns, along with a polyethylene glycol (PEG) 200 plasticizer and deionized water. The components were mixed in the following amounts:

| Component | Pounds in mixture |
|---|---|
| Alum. Oxide grit | 24 |
| BINDZIL 2040 silica sol | 62 |
| PEG 200 | 3.8 |
| Deionized water | 210 |

The components were thoroughly mixed using a high shear mixer for 15 minutes to provide a uniform aqueous dispersion.

The mixture was then spray dried using the same Niro brand spray dryer. The mixture was heated and fed into the inlet of the spray dryer at a temperature of about 343° C. The outlet temperature of the spray dryer was measured to be about 150° C. The spray dryer was operated at 350 Hertz. The spray drying process substantially removed the water from the mixture and the remaining components were observed to form a powder of small, generally round aggregates. A total of about 26 pounds of the aggregates were collected during a 2 hour run of the spray dryer apparatus, with about 8 pounds of aggregates being collected from the main drying chamber and about 18 pounds of aggregates being collected from the cyclone. No further sintering or heating was required to form the aggregates.

The aggregates were examined under magnification and observed to be formed of a phase of silica and PEG with particles of the aluminum oxide grit imbedded thereon. The average size of the aggregates was measured using a Microtrack size distribution analysis, using both wet and dry sample methods. For the cyclone aggregates, the average size was measured to be 20.38 microns by the wet sample method and 22.4 microns by the dry sample method. For the drying chamber aggregates, the average size was measured to be 45.97 microns by the wet sample method and 45.91 microns by the dry sample method. The final moisture content of the aggregates, after spray drying, was 1.76 weight percent for the cyclone aggregates and 1.54 for the drying chamber aggregates.

EXAMPLE 8

Diamond 1 Chamber

A powder of fine abrasive aggregates including diamond grit combined with silica nanoparticles was produced by the following method. An aqueous colloidal silica was mixed with diamond grit having an average particle size of 1.1 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution was used having about 40% silica ($SiO_2$) by weight, a silica particle size of about 20 nm, and a base-stabilized pH of about 10. The components were mixed in the following amounts:

| Component | Pounds in mixture |
|---|---|
| Diamond grit | 6.6 |
| BINDZIL 2040 silica sol | 13.2 |
| PEG 200 | 0.9 |
| Deionized water | 45 |

The components were thoroughly mixed using a high shear mixer to provide a uniform aqueous dispersion having about 20% solids in water.

The mixture was then spray dried using a Niro SD6.3 rotary atomizer spray dryer with an FF-1 atomizer available from Niro, Inc. of Columbia, Md. The mixture was heated and fed into the inlet of the spray dryer at a temperature of about 342° C. The outlet temperature of the spray dryer was measured to be about 152° C. The spray drying process substantially removed the water from the mixture and the remaining components were observed to form a powder of small, generally round aggregates which were collected for analysis. About 85% of the aggregate particles were collected from the dryer cyclone unit and about 15% were collected from the main drying of the spray dryer apparatus. No further sintering or heating was required to form the aggregates.

The aggregates were examined under magnification and observed to be formed of a phase of silica nanoparticles and PEG combined with particles of the diamond grit. The average size of the aggregates collected from the chamber was measured to be about 40-50 microns, SSA=72 $m^2/g$. The aggregates are shown in FIG. 9.

EXAMPLE 9

Diamond 1 Cyclone

A powder of fine abrasive aggregates including diamond grit combined with silica nanoparticles was produced by the following method. An aqueous colloidal silica was mixed with diamond grit having an average particle size of 1.1 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution was used having about 40% silica ($SiO_2$) by weight, a silica particle size of about 20 nm, and a base-stabilized pH of about 10.

The components were mixed in the following amounts:

| Component | Pounds in mixture |
|---|---|
| Diamond grit | 6.6 |
| BINDZIL 2040 silica sol | 13.2 |
| PEG 200 | 0.9 |
| Deionized water | 45 |

The components were thoroughly mixed using a high shear mixer to provide a uniform aqueous dispersion having about 20% solids in water.

The mixture was then spray dried using a Niro SD6.3 rotary atomizer spray dryer with an FF-1 atomizer available from Niro, Inc. of Columbia, Md. The mixture was heated and fed into the inlet of the spray dryer at a temperature of about 342° C. The outlet temperature of the spray dryer was measured to be about 152° C. The spray drying process substantially removed the water from the mixture and the remaining components were observed to form a powder of small, generally round aggregates which were collected for analysis. About 85% of the aggregate particles were collected from the dryer cyclone unit and about 15% were collected from the main drying of the spray dryer apparatus. No further sintering or heating was required to form the aggregates.

Figure 10:
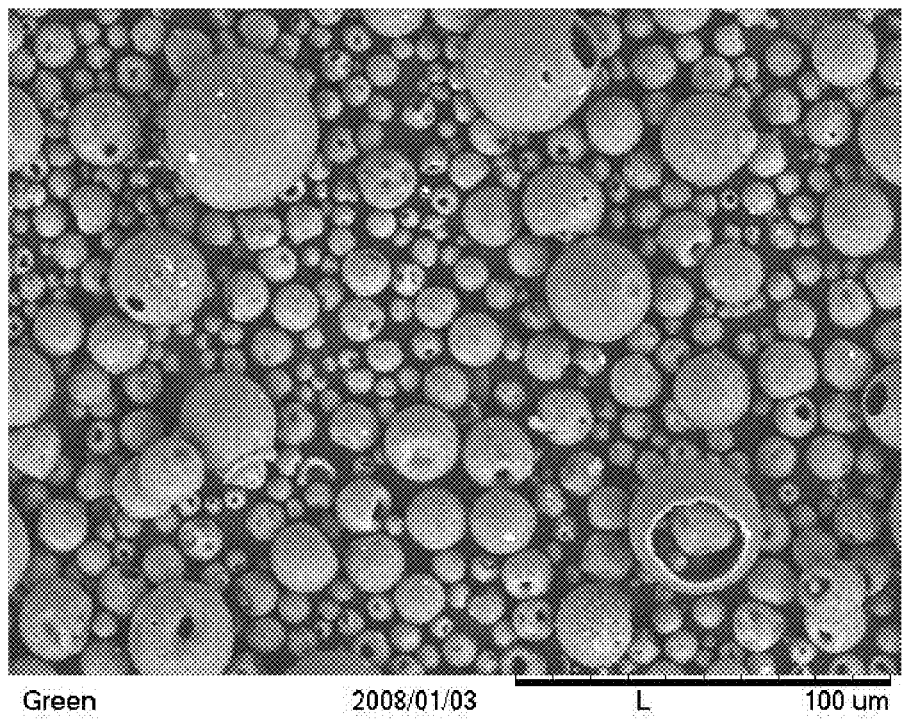

The aggregates were examined under magnification and observed to be formed of a phase of silica nanoparticles and PEG combined with particles of the diamond grit. The average size of the aggregates collected from the cyclone was measured to be about 25 microns, SSA=71 $m^2/g$. The aggregates are shown in FIG. 10.

EXAMPLE 10

NGC 2500 Chamber

A powder of fine abrasive aggregates including NGC 2500 combined with silica nanoparticles was produced by the following method. An aqueous colloidal silica was mixed with NGC 2500 grit having an average particle size of 8 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution was used having about 40% silica ($SiO_2$) by weight, a silica particle size of about 20 nm, and a base-stabilized pH of about 10. The components were mixed in the following amounts:

| Component | Pounds in mixture |
|---|---|
| NGC 2500 | 75 |
| BINDZIL 2040 silica sol | 190 |
| PEG 200 | 10.5 |
| Deionized water | 25 |

The components were thoroughly mixed using a high shear mixer to provide a uniform aqueous dispersion having about 54% solids in water.

The mixture was then spray dried using a Niro SD6.3 rotary atomizer spray dryer with an FF-1 atomizer available from Niro, Inc. of Columbia, Md. The mixture was heated and fed into the inlet of the spray dryer at a temperature of about 342° C. The outlet temperature of the spray dryer was measured to be about 152° C. The spray drying process substantially removed the water from the mixture and the remaining components were observed to form a powder of small, generally round aggregates which were collected for analysis. About 50% of the aggregate particles were collected from the dryer cyclone unit and about 50% were collected from the main drying of the spray dryer apparatus. No further sintering or heating was required to form the aggregates.

Figure 11:
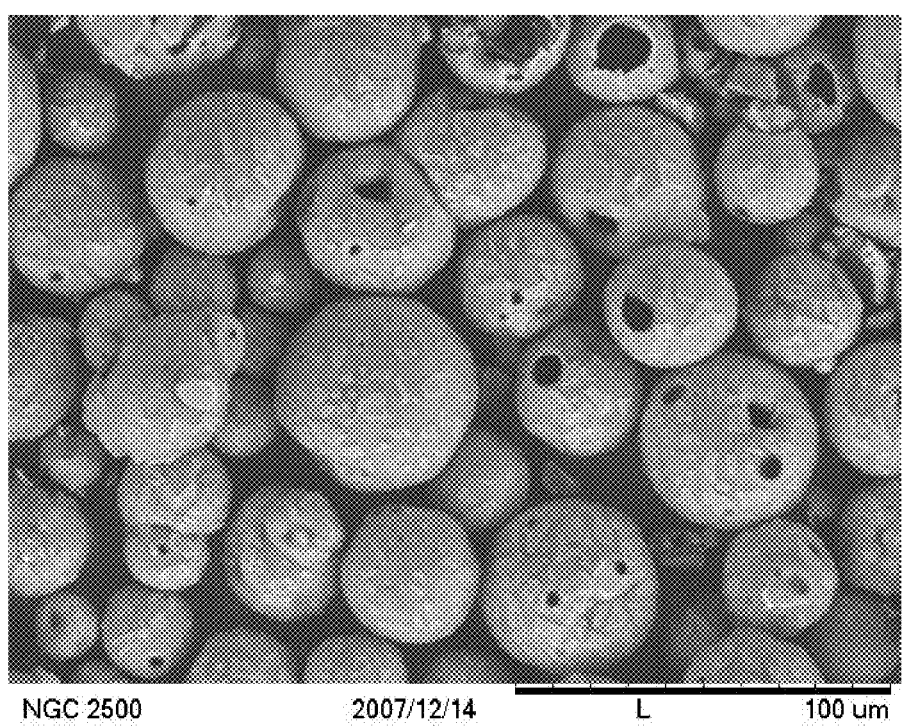

The aggregates were examined under magnification and observed to be formed of a phase of silica nanoparticles and PEG combined with particles of the NGC grit. The average size of the aggregates collected from the chamber was measured to be about 40-50 microns, SSA 63 $m^2/g$. The aggregates are shown in FIG. 11.

EXAMPLE 11

CBN 9 micron Chamber

A powder of fine abrasive aggregates including CBN combined with silica nanoparticles was produced by the following method. An aqueous colloidal silica was mixed with CBN grit having an average particle size of 9 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution was used having about 40% silica ($SiO_2$) by weight, a silica particle size of about 20 nm, and a base-stabilized pH of about 10. The components were mixed in the following amounts:

| Component | Grams in mixture |
|---|---|
| CBN 9 micron | 204.3 |
| BINDZIL 2040 silica sol | 454 |
| PEG 200 | 27.24 |
| Deionized water | 72.64 |

The components were thoroughly mixed using a high shear mixer to provide a uniform aqueous dispersion having about 54% solids in water.

The mixture was then spray dried using a Pentronix Model 370 rotary atomizer spray dryer. The mixture was fed at room temperature into the inlet of the spray dryer at a temperature of about 220° C. The outlet temperature of the spray dryer was measured to be about 98° C. The spray drying process substantially removed the water from the mixture and the remaining components were observed to form a powder of small, generally round aggregates which were collected for analysis. About 5% of the aggregate particles were collected from the dryer cyclone unit and about 95% were collected from the main drying of the spray dryer apparatus. No further sintering or heating was required to form the aggregates.

Figure 12:
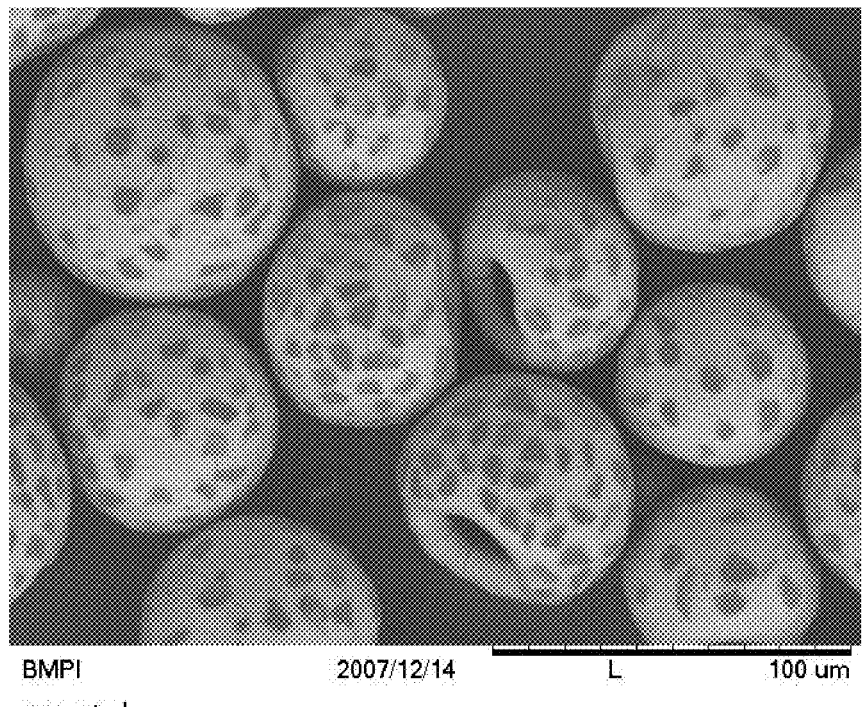

The aggregates were examined under magnification and observed to be formed of a phase of silica nanoparticles and PEG combined with particles of the CBN grit. The average size of the aggregates collected from the chamber was measured to be about 80 microns, SSA=62 m2/g. The aggregates are shown in FIG. 12

EXAMPLE 12

Nickel coated CBN 15 micron Chamber

A powder of fine abrasive aggregates including CBN combined with silica nanoparticles was produced by the following method. An aqueous colloidal silica was mixed with Nickel coated CBN grit having an average particle size of 15 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution was used having about 40% silica ($SiO_2$) by weight, a silica particle size of about 20 nm, and a base-stabilized pH of about 10. The components were mixed in the following amounts:

| Component | Grams in mixture |
| --- | --- |
| Nickel coated CBN 15 micron | 1200 |
| BINDZIL 2040 silica sol | 454 |
| PEG 200 | 29 |
| Deionized water | 63 |

The components were thoroughly mixed using a high shear mixer to provide a uniform aqueous dispersion having about 81% solids in water.

The mixture was then spray dried using a Pentronix Model 370 rotary atomizer spray dryer. The mixture was fed at room temperature into the inlet of the spray dryer at a temperature of about 220° C. The outlet temperature of the spray dryer was measured to be about 98° C. The spray drying process substantially removed the water from the mixture and the remaining components were observed to form a powder of small, generally round aggregates which were collected for analysis. About 5% of the aggregate particles were collected from the dryer cyclone unit and about 95% were collected from the main drying of the spray dryer apparatus. No further sintering or heating was required to form the aggregates.

Figure 13:
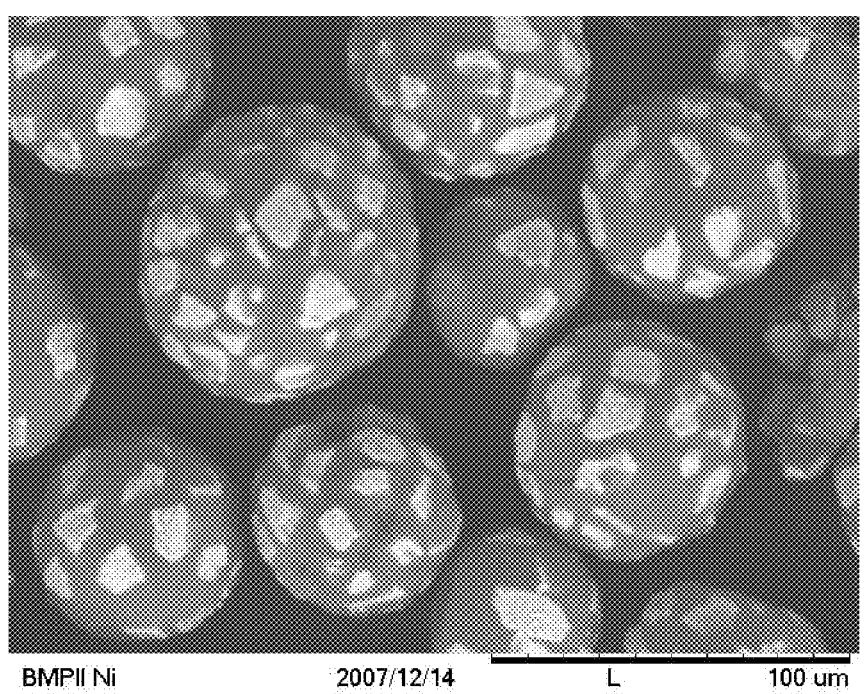

The aggregates were examined under magnification and observed to be formed of a phase of silica nanoparticles and PEG combined with particles of the CBN grit. The average size of the aggregates collected from the chamber was measured to be about 70 microns, SSA 23 m2/g. The aggregates are shown in FIG. 13.

EXAMPLE 13

NG C 2500

A powder of fine abrasive aggregates including NGC 2500 combined with Ceria nanoparticles was produced by the following method. An aqueous Nano Ceria was mixed with NGC 2500 grit having an average particle size of 8 microns, along with a polyethylene glycol (PEG) 200 plasticizer and deionized water. The Nano Ceria used was by Degussa AG, Advanced Nanomaterials, which is believed to be aqueous Ceria solution was used having about 40% Ceria) by weight, a silica particle size of about 38 nm, and a base-stabilized pH of about 10. The components were mixed in the following amounts:

| Component | Grams in mixture |
| --- | --- |
| NGC 2500 | 168 |
| Nano Ceria | 454 |
| PEG 200 | 27.54 |
| Deionized water | 63 |

The components were thoroughly mixed using a high shear mixer to provide a uniform aqueous dispersion having about 53% solids in water.

The mixture was then spray dried using a Pentronix Model 370 rotary atomizer spray dryer. The mixture was fed at room temperature into the inlet of the spray dryer at a temperature of about 220° C. The outlet temperature of the spray dryer was measured to be about 98° C. The spray drying process substantially removed the water from the mixture and the remaining components were observed to form a powder of small, generally round aggregates which were collected for analysis. About 5% of the aggregate particles were collected from the dryer cyclone unit and about 95% were collected from the main drying of the spray dryer apparatus. No further sintering or heating was required to form the aggregates.

Figure 14:
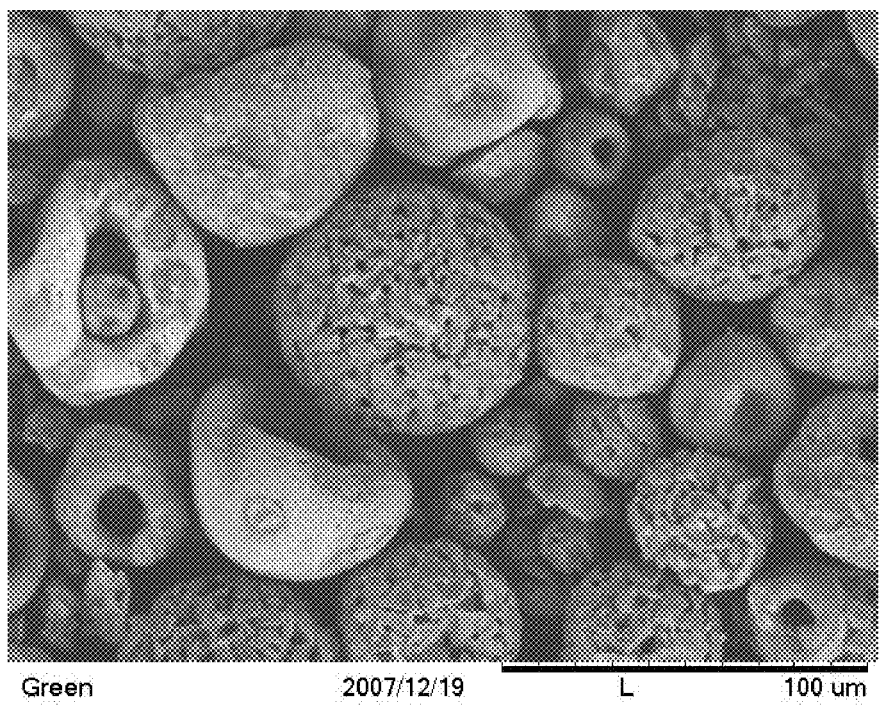

The aggregates were examined under magnification and observed to be formed of a phase of ceria nanoparticles and PEG combined with particles of the NGC grit. The average size of the aggregates collected from the chamber was measured to be about 50 microns, SSA=8 m2/g. The aggregates are shown in FIG. 14.

EXAMPLE 14

NG C 2500

A powder of fine abrasive aggregates including NGC 2500 combined with Alumina nanoparticles was produced by the following method. An aqueous Soft Alumina was mixed with NGC 2500 grit having an average particle size of 8 microns, along with a polyethylene glycol (PEG) 200 plasticizer and deionized water. The Alumina used was by Saint Gobain, which is believed to be aqueous Alumina solution was used having about 40% Alumina) by weight, a silica particle size of about 38 nm, and a base-stabilized pH of about 10. The components were mixed in the following amounts:

| Component | Grams in mixture |
| --- | --- |
| NGC 2500 | 168 |
| Alumina | 454 |
| PEG 200 | 27.54 |
| Deionized water | 63 |

The components were thoroughly mixed using a high shear mixer to provide a uniform aqueous dispersion having about 53% solids in water.

The mixture was then spray dried using a Pentronix Model 370 rotary atomizer spray dryer. The mixture was fed at room temperature into the inlet of the spray dryer at a temperature of about 220° C. The outlet temperature of the spray dryer was measured to be about 98° C. The spray drying process substantially removed the water from the mixture and the remaining components were observed to form a powder of small, generally round aggregates which were collected for analysis. About 5% of the aggregate particles were collected from the dryer cyclone unit and about 95% were collected from the main drying of the spray dryer apparatus. No further sintering or heating was required to form the aggregates.

Figure 15:
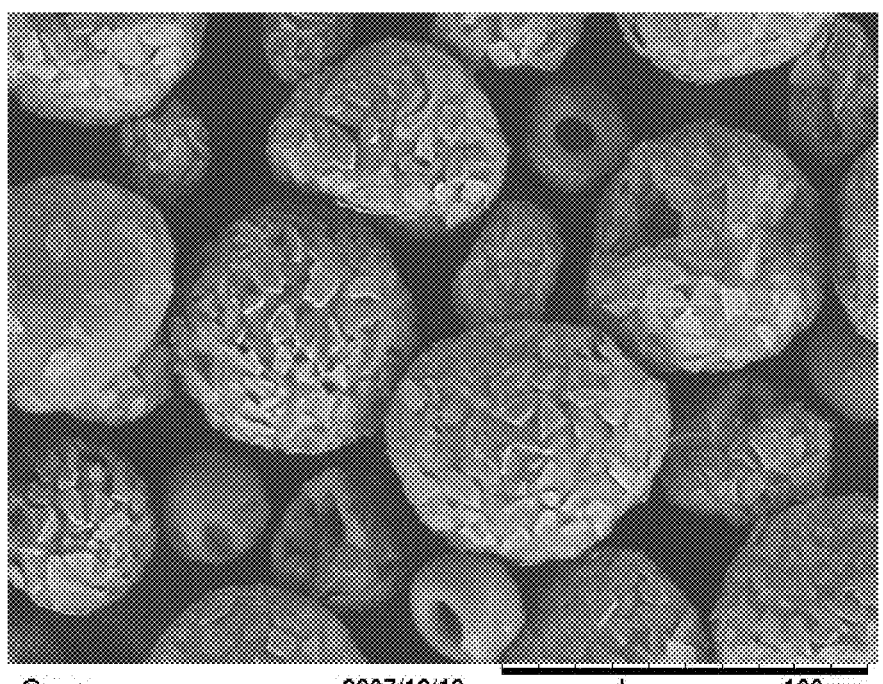

The aggregates were examined under magnification and observed to be formed of a phase of Alumina nanoparticles and PEG combined with particles of the NGC 2500 grit. The average size of the aggregates collected from the chamber was measured to be about 70 microns, SSA 56 m2/g. The aggregates are shown in FIG. 15.

EXAMPLE 15

NG C 2500

A powder of fine abrasive aggregates including NGC 2500 combined with silica nanoparticles was produced by the following method. An aqueous Mega Sil was mixed with NGC 2500 grit having an average particle size of 5 microns, along with a polyethylene glycol (PEG) 200 plasticizer and deionized water. The Mega Sil used was by Moyco Technologies, which is believed to be aqueous Mega sil (Silica) solution was used having about 40% Silica) by weight, a silica particle size of about 100 nm, and a base-stabilized pH of about 10. The components were mixed in the following amounts:

| Component | Grams in mixture |
|---|---|
| NGC 2500 | 168 |
| Mega Sil | 454 |
| PEG 200 | 27.54 |
| Deionized water | 63 |

The components were thoroughly mixed using a high shear mixer to provide a uniform aqueous dispersion having about 53% solids in water.

The mixture was then spray dried using a Pentronix Model 370 rotary atomizer spray dryer. The mixture was fed at room temperature into the inlet of the spray dryer at a temperature of about 220° C. The outlet temperature of the spray dryer was measured to be about 98° C. The spray drying process substantially removed the water from the mixture and the remaining components were observed to form a powder of small, generally round aggregates which were collected for analysis. About 5% of the aggregate particles were collected from the dryer cyclone unit and about 95% were collected from the main drying of the spray dryer apparatus. No further sintering or heating was required to form the aggregates.

The aggregates were examined under magnification and observed to be formed of a phase of Silica nanoparticles and PEG combined with particles of the NGC grit. The average size of the aggregates collected from the chamber was measured to be about 50 microns, SSA=52 m2/g.

Figure 16:
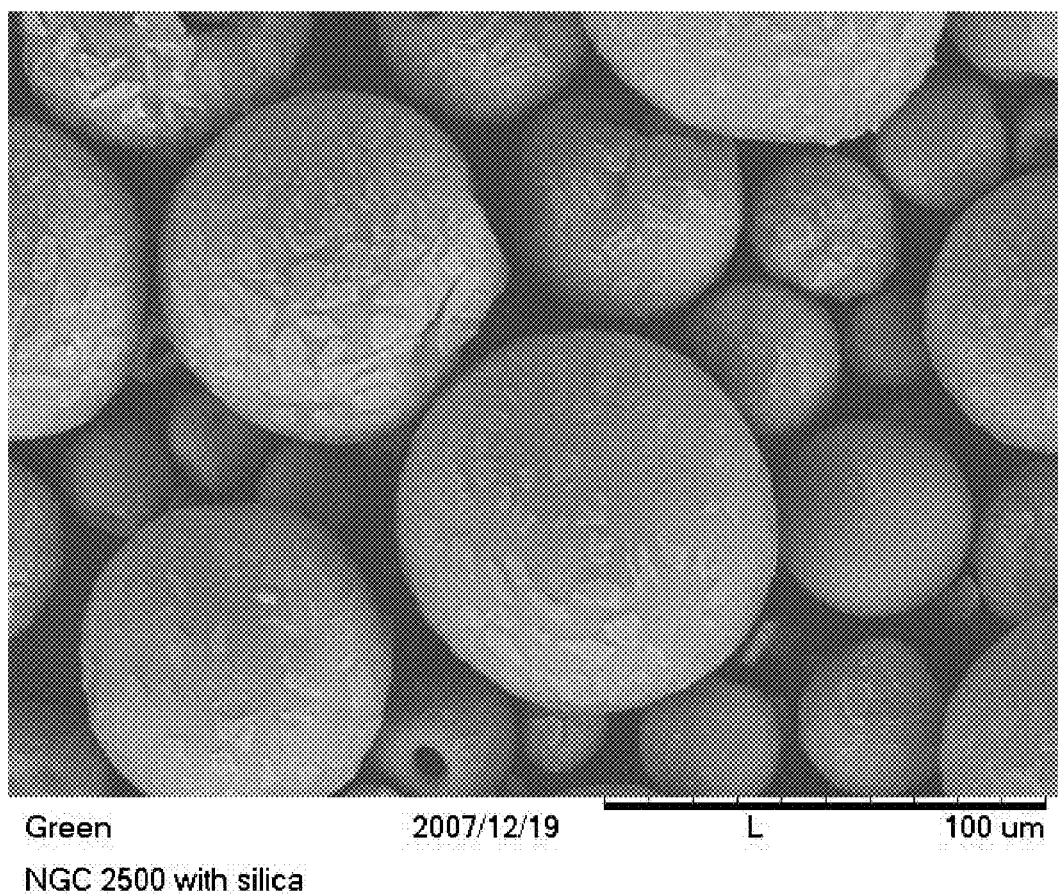

In addition to being used as abrasives, in some embodiments of the present disclosure, the aggregates may also be used in application other than abrasives for polishing and finishing of materials. For instance, it is believed that the aggregates of the present disclosure may be incorporated into lubricant formulations. The aggregates may also incorporated into composite materials for the purpose of enhancing the strength of the composites. In addition, it is believed that the aggregates may also be employed as a heat sink material in certain applications. The aggregates are shown in FIG. 16.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A coated abrasive product, comprising:
a substrate; and
particulate material bonded to the substrate, the particulate material comprising green, unfired abrasive aggregates having a generally spheroidal or toroidal shape, the aggregates formed from a composition comprising abrasive grit particles and a nanoparticle binder,
wherein the nanoparticle binder forms a continuous matrix phase in which the abrasive grit particles are uniformly distributed.

2. The coated abrasive product of claim 1, wherein the aggregates have said spheroidal shape and are hollow.

3. The coated abrasive product of claim 1, wherein the particulate material has an average particle size within a range of about 10 to about 150 microns.

4. The coated abrasive product of claim 1, wherein the abrasive grit particles have an average particle size within a range of about 0.2 microns to 10 microns.

5. The coated abrasive product of claim 1, wherein the abrasive grit particles have a Mohs hardness not less than 5 and comprise a material selected from the group consisting of oxides, carbides, nitrides and carbonaceous materials.

6. The coated abrasive product of claim 5, wherein said material is selected from the group consisting of cerium oxide, aluminum oxide, silicon oxide, zirconium oxide, silicon carbide, titanium carbide, titanium nitride, silicon nitride boron nitride, diamond and combinations thereof.

7. The coated abrasive product of claim 1, wherein the abrasive grit particles are coated with a metallurgical coating.

8. The coated abrasive product of claim 1, wherein the nanoparticle binder has an average particle size not greater than 150 nanometers.

9. The coated abrasive product of claim 8, wherein the nanoparticle binder is selected from the group consisting of cerium oxide, silicon oxide, aluminum oxide, and diamond.

10. The coated abrasive product of claim 9, wherein the nanoparticle binder comprises silicon oxide.

11. The coated abrasive product of claim 1, wherein the composition further comprises a plasticizer.

12. The coated abrasive product of claim 11, wherein the plasticizer is selected from the group consisting of inorganic salt dispersants, and a polymeric plasticizer effective to improve dispersion of the abrasive grit particles in the composition.

13. The coated abrasive product of claim 11, wherein the plasticizer comprises a monomeric or a polymeric polyol.

14. The coated abrasive product of claim 13, wherein plasticizer comprises a monomeric polyol selected from the group consisting of 1,2-propanediol, 1,4-propanediol, ethylene glycol, glycerin, pentaerythritol, malitol, sorbitol, isomalt, or any combination thereof; or any combination thereof.

15. The coated abrasive product of claim 13, wherein plasticizer comprises a polymeric polyol selected from the group consisting of polyethylene glycol, polypropylene glycol, poly (tetramethylene ether) glycol, polyethylene oxide, polypropylene oxide, a reaction product of glycerin and propylene oxide, ethylene oxide, or a combination thereof, a reaction product of a diol and a dicarboxylic acid or its derivative, a natural oil polyol; or any combination thereof.

16. The coated abrasive product of claim 15, wherein plasticizer comprises a polymeric polyol selected from the group consisting of a reaction product of a diol and a dicarboxylic acid or its derivative, polyethylene glycol, polypropylene glycol, polyethylene oxide, polypropylene oxide, or a reaction product of glycerin and propylene oxide or ethylene oxide.

17. The coated abrasive product of claim 16, wherein the plasticizer comprises polyethylene glycol.

18. The coated abrasive product of claim 11, wherein the polymeric plasticizer has a molecular weight within a range of about 10 to about 3000.

19. The coated abrasive product of claim 1, further comprising a polymeric bond material bonding the aggregates to the substrate.

20. The coated abrasive product of claim 19, wherein the aggregates are slurry-coated onto the substrate such that the polymeric bond material forms a continuous bonding matrix in which the aggregates are dispersed.

21. The coated abrasive product of claim 19, wherein the polymeric bond material is in the form of a make coat overlying the substrate, the aggregates being adhered to the substrate by the make coat.

22. The coated abrasive product of claim 21, further comprising a size coat overlying the aggregates.

23. The coated abrasive product of claim 1, wherein the composition comprises about 0.1 to about 85 weight percent of the abrasive grit particles, from about 0.1 to about 80 weight percent of the nanoparticle binder, and from about 0.5 to about 40 weight percent of the plasticizer, weight percents based on the total solids content of the composition.

24. The coated abrasive product of claim 23, wherein the composition comprises about comprise about 10 to 50 weight percent abrasive grit particles, about 50 to 90 weight percent nanoparticle binder, and about 0.5 to 15 weight percent plasticizer.

25. The coated abrasive product of claim 24, wherein the composition comprises about 15 to 40 weight percent abrasive grit particles and about 60 to 85 weight percent nanoparticle binder.

26. A coated abrasive product, comprising:
a substrate; and
particulate material bonded to the substrate, the particulate material comprising green, unfired abrasive aggregates having a generally spheroidal shape and are hollow, or a toroidal shape, the aggregates formed from a composition comprising abrasive grit particles and a nanoparticle binder.

27. An coated abrasive product, comprising:
a substrate; and
particulate material bonded to the substrate, the particulate material comprising green, unfired abrasive aggregates having a generally spheroidal or toroidal shape, the aggregates formed from a composition comprising abrasive grit particles and a nanoparticle binder,
wherein the particulate material has an average particle size within a range of about 10 to about 150 microns.

28. An coated abrasive product, comprising:
a substrate; and
particulate material bonded to the substrate, the particulate material comprising green, unfired abrasive aggregates having a generally spheroidal or toroidal shape, the aggregates formed from a composition comprising abrasive grit particles and a nanoparticle binder,
wherein the abrasive grit particles have a Mohs hardness not less than 5 and comprise a material selected from the group consisting of oxides, carbides, nitrides and carbonaceous materials.

* * * * *